US012804549B2

(12) United States Patent
Manolakos et al.

(10) Patent No.: US 12,804,549 B2
(45) Date of Patent: Nov. 17, 2026

(54) WAKE-UP SIGNAL (WUS) FOR SIDELINK POSITIONING

(71) Applicant: QUALCOMM Incorporated, San Diego, CA (US)

(72) Inventors: Alexandros Manolakos, Athens (GR); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 18/727,501

(22) PCT Filed: Jan. 10, 2023

(86) PCT No.: PCT/US2023/060380
§ 371 (c)(1),
(2) Date: Jul. 9, 2024

(87) PCT Pub. No.: WO2023/154587
PCT Pub. Date: Aug. 17, 2023

(65) Prior Publication Data

US 2025/0088967 A1 Mar. 13, 2025

(30) Foreign Application Priority Data

Feb. 8, 2022 (GR) .............................. 20220100126

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0048* (2013.01); *H04W 24/08* (2013.01);
(Continued)

(58) Field of Classification Search
CPC ..... H04L 1/007; H04L 1/0003; H04L 1/1812; H04L 1/1607; H04L 5/0058;
(Continued)

(56) References Cited

U.S. PATENT DOCUMENTS 11,617,135 B1 * 3/2023 Wu ........................ H04L 5/0091 370/318
2020/0288399 A1 * 9/2020 Park ....................... H04W 80/02
(Continued)

FOREIGN PATENT DOCUMENTS

WO WO-2021262991 12/2021
WO WO-2022013446 A2 1/2022

OTHER PUBLICATIONS

CATT: "Discussion on other aspects on AI/ML for beam management", 3GPP TSG RAN WG1 #109-e, R1-2203454, No. e-Meeting, May 9, 2022-May 20, 2022, 7 Pages, May 20, 2022.
(Continued)

*Primary Examiner* — Omar J Ghowrwal
(74) *Attorney, Agent, or Firm* — Thien T. Nguyen

(57) ABSTRACT

In an aspect, a user equipment (UE) may receive at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations. The UE may
(Continued)

transition from a sleep state to a wake-up state during the DRX on-time to conduct one or more sidelink positioning operations dependent on whether the wake-up signal is received during the wake-up signal monitoring window.

28 Claims, 21 Drawing Sheets

(51) Int. Cl.

| | |
|---|---|
| ***H04W 24/08*** | (2009.01) |
| ***H04W 24/10*** | (2009.01) |
| ***H04W 64/00*** | (2009.01) |
| ***H04W 76/28*** | (2018.01) |
| ***H04W 92/18*** | (2009.01) |

(52) U.S. Cl.
CPC ....... *H04W 24/10* (2013.01); *H04W 52/0216* (2013.01); *H04W 52/0229* (2013.01); *H04W 52/028* (2013.01); *H04W 64/00* (2013.01); *H04W 76/28* (2018.02); *H04W 92/18* (2013.01); *Y02D 30/70* (2020.08)

(58) Field of Classification Search
CPC ................. H04L 27/3488; H04L 27/36; H04L 2001/0098; H04L 1/0009; H04L 1/0041; H04L 5/0046; H04L 5/0048; H03M 13/25; H03M 13/356; H04W 52/0235; H04W 76/28; H04W 52/0216; H04W 52/028; H04W 52/0229; H04W 24/08; H04W 24/10; H04W 64/00; H04W 92/18; Y02D 30/70
See application file for complete search history.

(56) References Cited

U.S. PATENT DOCUMENTS

| | | | | |
|---|---|---|---|---|
| 2021/0259044 | A1 | 8/2021 | Islam et al. | |
| 2021/0410098 | A1 | 12/2021 | Bao et al. | |
| 2022/0295442 | A1 * | 9/2022 | Goyal | G01S 5/0072 |
| 2023/0262601 | A1 * | 8/2023 | Ganesan | H04W 52/0216 370/311 |

OTHER PUBLICATIONS

Huawei et al., “NR Sidelink and V2X Enhancements”, 3GPP TSG RAN Meeting #92-e, RWS-210445, 3rd Generation Partnership Project (3GPP), Mobile Competence Centre, 650, Route Des Lucioles, F-06921 Sophia-Antipolis Cedex, France, vol. TSG RAN, No. Electronic Meeting, Jun. 14, 2021-Jun. 18, 2021, 7 Pages, Jun. 7, 2021, XP052025997.
International Search Report and Written Opinion—PCT/US2023/060380—ISA/EPO—Apr. 21, 2023.
Moderator (Oppo): “Discussion Summary#2 for Other Aspects on AI/ML for Beam Management”, 3GPP TSG RAN WG1 #109-e, R1-2205253, No. e-Meeting, May 9, 2022-May 20, 2022, May 20, 2022, 90 pages.
Qualcomm: “NR Sidelink Evolution & Use Case Expansion for Rel-18”, 3GPP TSG RAN Rel-18 workshop, RWS-210009, 3rd Generation Partnership Project, Mobile Competence Centre, 650, Route Des Lucioles, F-06921 Sophia-Antipolis Cedex, France, vol. TSG RAN, No. Electronic Meeting, Jun. 28, 2021-Jul. 2, 2021, 11 Pages, Jun. 7, 2021, XP052025578.
RAN Vice-Chair (AT&T) : “Email Discussion Summary for [RAN-R18-WS-non-eMBB-Overall]”, 3GPP TSG RAN Rel-18 workshop, RWS-210655, 3rd Generation Partnership Project, Mobile Competence Centre, 650, Route Des Lucioles, F-06921 Sophia-Antipolis Cedex, France, vol. RAN Wg3, No. Electronic Meeting, Jun. 28, 2021-Jul. 2, 2021, 129 Pages, Jul. 1, 2021, XP052030340.

* cited by examiner

WAKE-UP SIGNAL (WUS) FOR SIDELINK POSITIONING

CROSS-REFERENCE TO RELATED APPLICATIONS

The present application for patent claims the benefit of GR Application No. 20220100126, entitled "WAKE-UP SIGNAL (WUS) FOR SIDELINK POSITIONING", filed Feb. 8, 2022, and is a national stage application, filed under 35 U.S.C. § 371, of International Patent Application No. PCT/US2023/060380, entitled, "WAKE-UP SIGNAL (WUS) FOR SIDELINK POSITIONING", filed Jan. 10, 2023, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first generation analog wireless phone service (1G), a second-generation (2G) digital wireless phone service (including interim 2.5G and 2.75G networks), a third generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and transitioning from a sleep state to a wake-up state during the DRX on-time to conduct one or more sidelink positioning operations dependent on whether the wake-up signal is received during the wake-up signal monitoring window.

In an aspect, a method of wireless communication performed by a network node includes transmitting at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmitting a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

In an aspect, a user equipment (UE) includes a memory; at least one transceiver; and at least one processor communicatively coupled to the memory and the at least one transceiver, the at least one processor configured to: receive, via the at least one transceiver, at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and transition from a sleep state to a wake-up state during the DRX on-time to conduct one or more sidelink positioning operations dependent on whether the wake-up signal is received during the wake-up signal monitoring window.

In an aspect, a network node includes a memory; at least one transceiver; and at least one processor communicatively coupled to the memory and the at least one transceiver, the at least one processor configured to: transmit, via the at least one transceiver, at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmit, via the at least one transceiver, a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

In an aspect, a user equipment (UE) includes means for receiving at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and means for transitioning from a sleep state to a wake-up state during the DRX on-time to conduct one or more sidelink positioning operations dependent on whether the wake-up signal is received during the wake-up signal monitoring window.

In an aspect, a network node includes means for transmitting at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and means for transmitting a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

In an aspect, a non-transitory computer-readable medium storing computer-executable instructions that, when executed by a user equipment (UE), cause the UE to: receive at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and transition from a sleep state to a wake-up state during the DRX on-time to conduct one or more sidelink positioning operations dependent on whether the wake-up signal is received during the wake-up signal monitoring window.

In an aspect, a non-transitory computer-readable medium storing computer-executable instructions that, when executed by a network node, cause the network node to: transmit at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmit a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
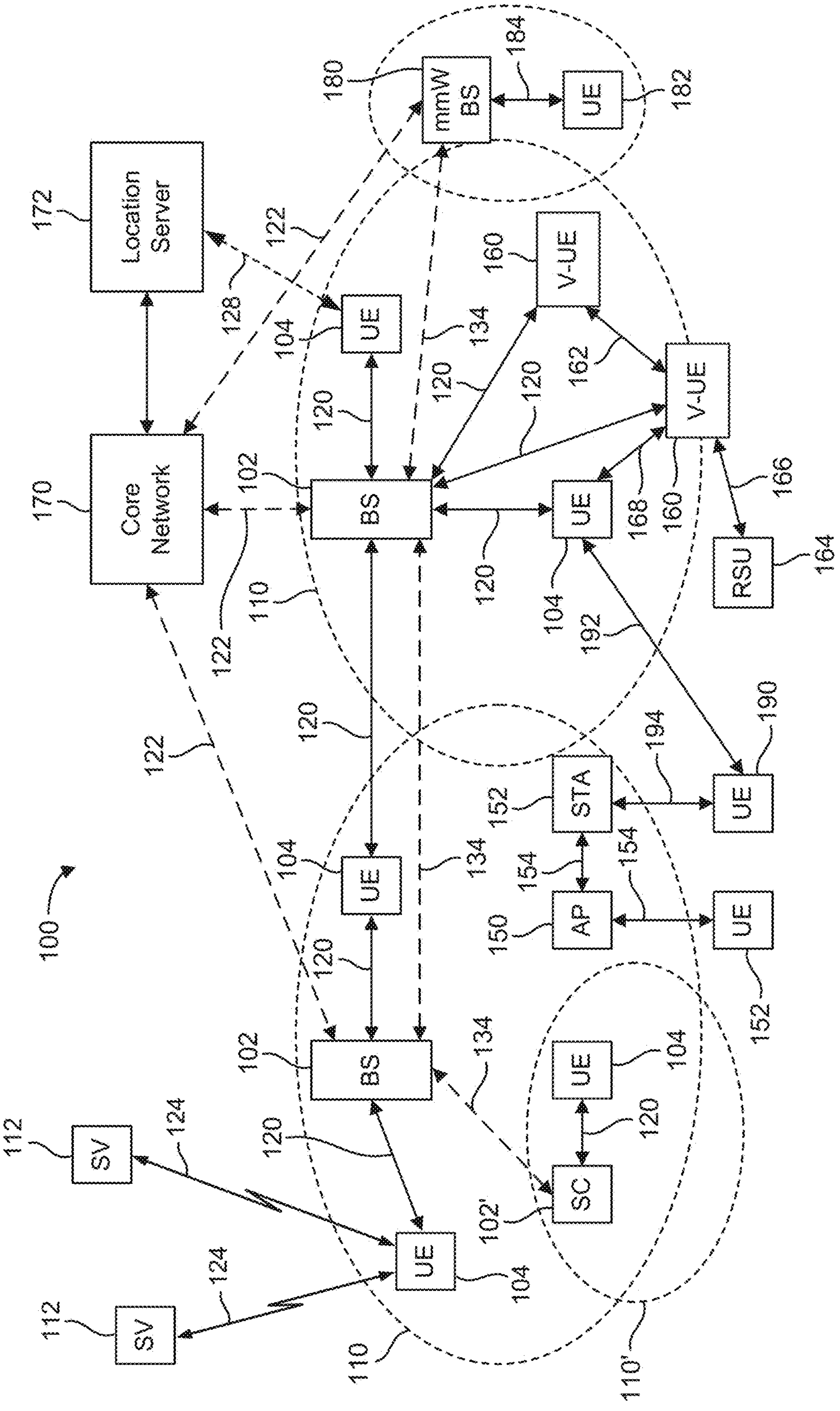
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a NR Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a WLAN access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace. RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE® technology.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by WLAN technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form toward each other (i.e., toward other V-UEs 160), toward RSUs 164, toward other UEs (e.g., UEs 104, 152, 182, 190), etc. Thus, in some cases. V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
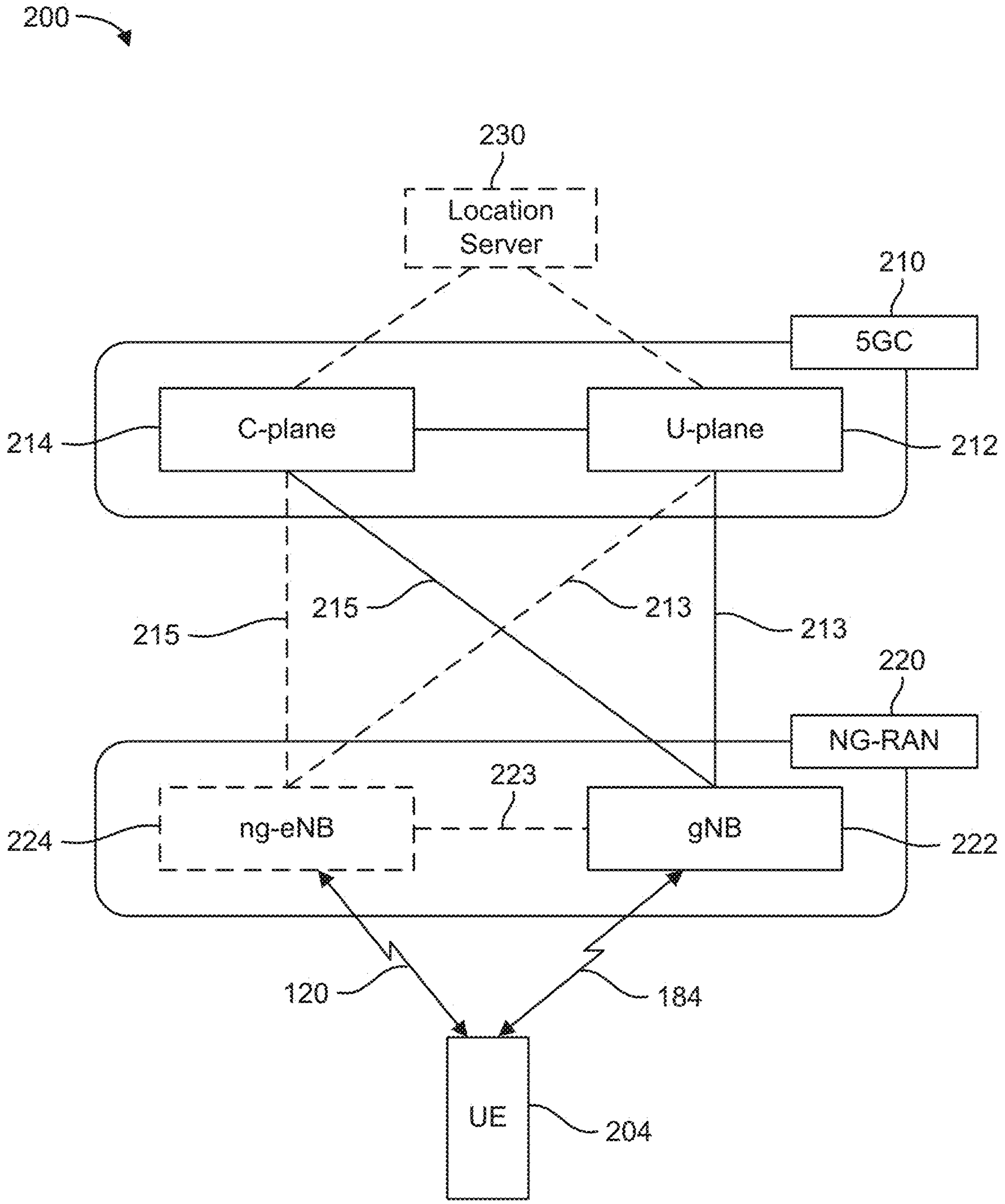
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
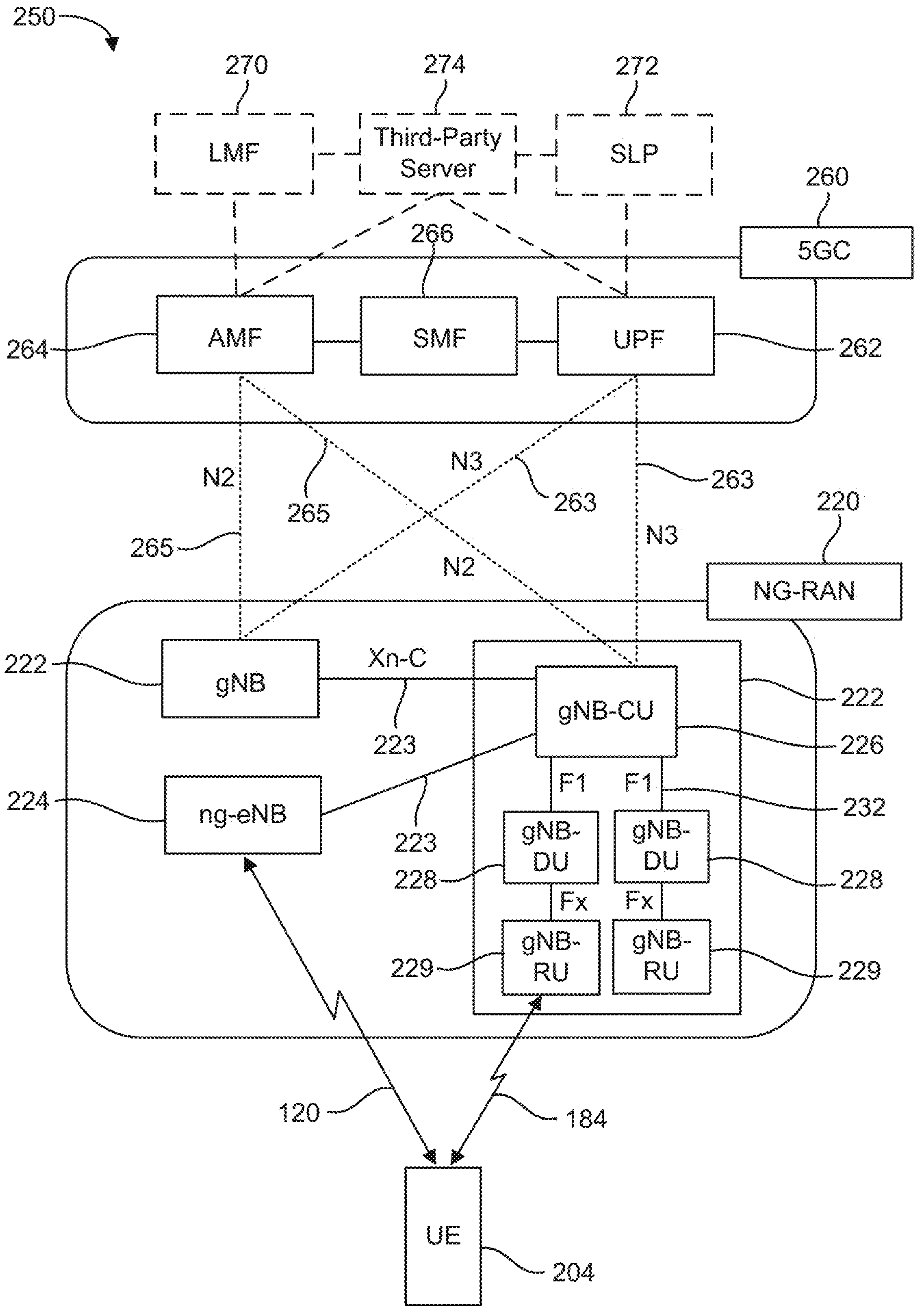

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management. UE IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, RAN sharing, positioning, session management, and the like, except for those functions allocated exclusively to the gNB-DU(s) 228. More specifically, the gNB-CU 226 generally host the RRC, service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
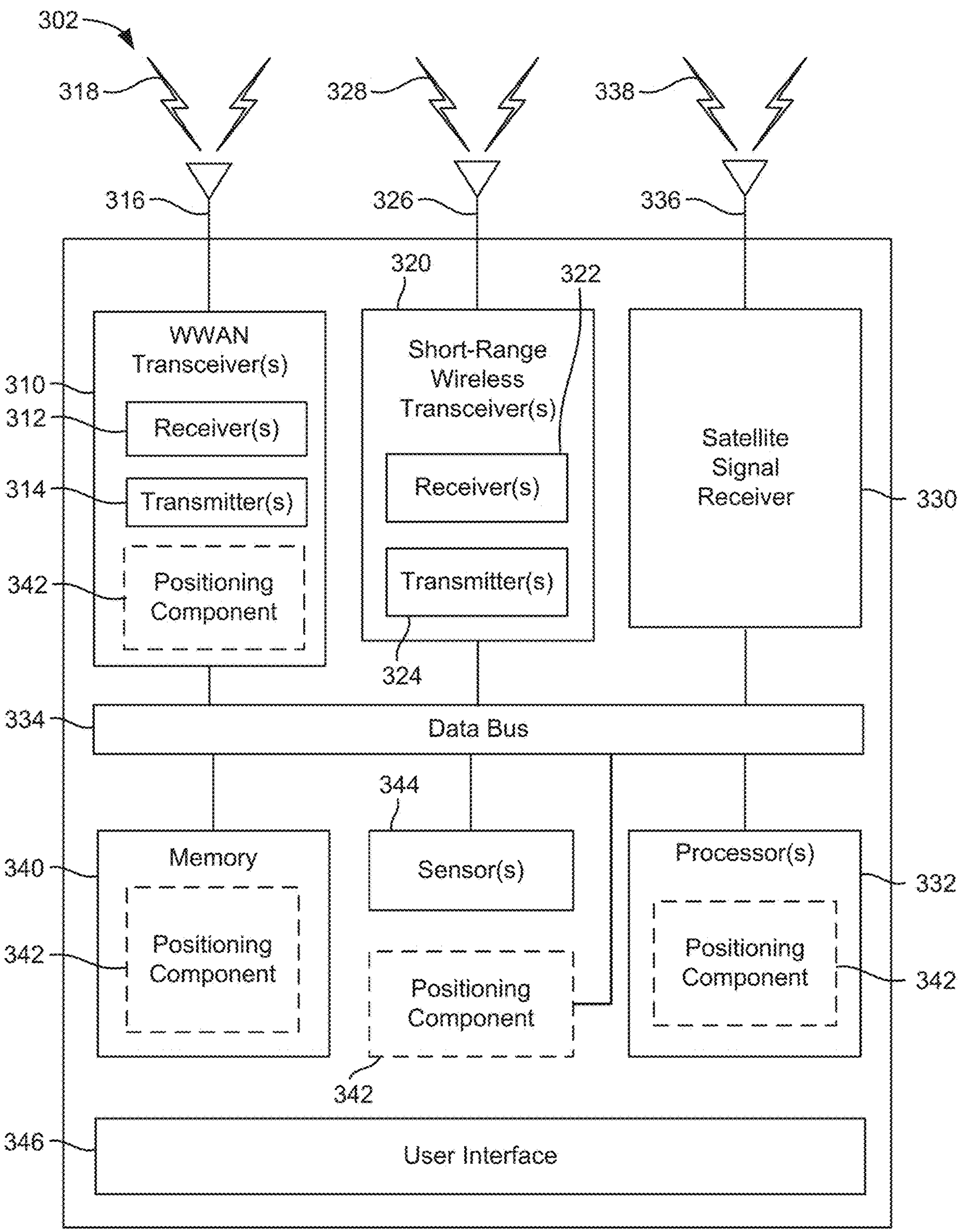
FIGS. 3A, 3B, and 3C are simplified block diagrams of several sample aspects of components that may be employed in a user equipment (UE), a base station, and a network entity, respectively, and configured to support communications as taught herein.
Figure 3B:
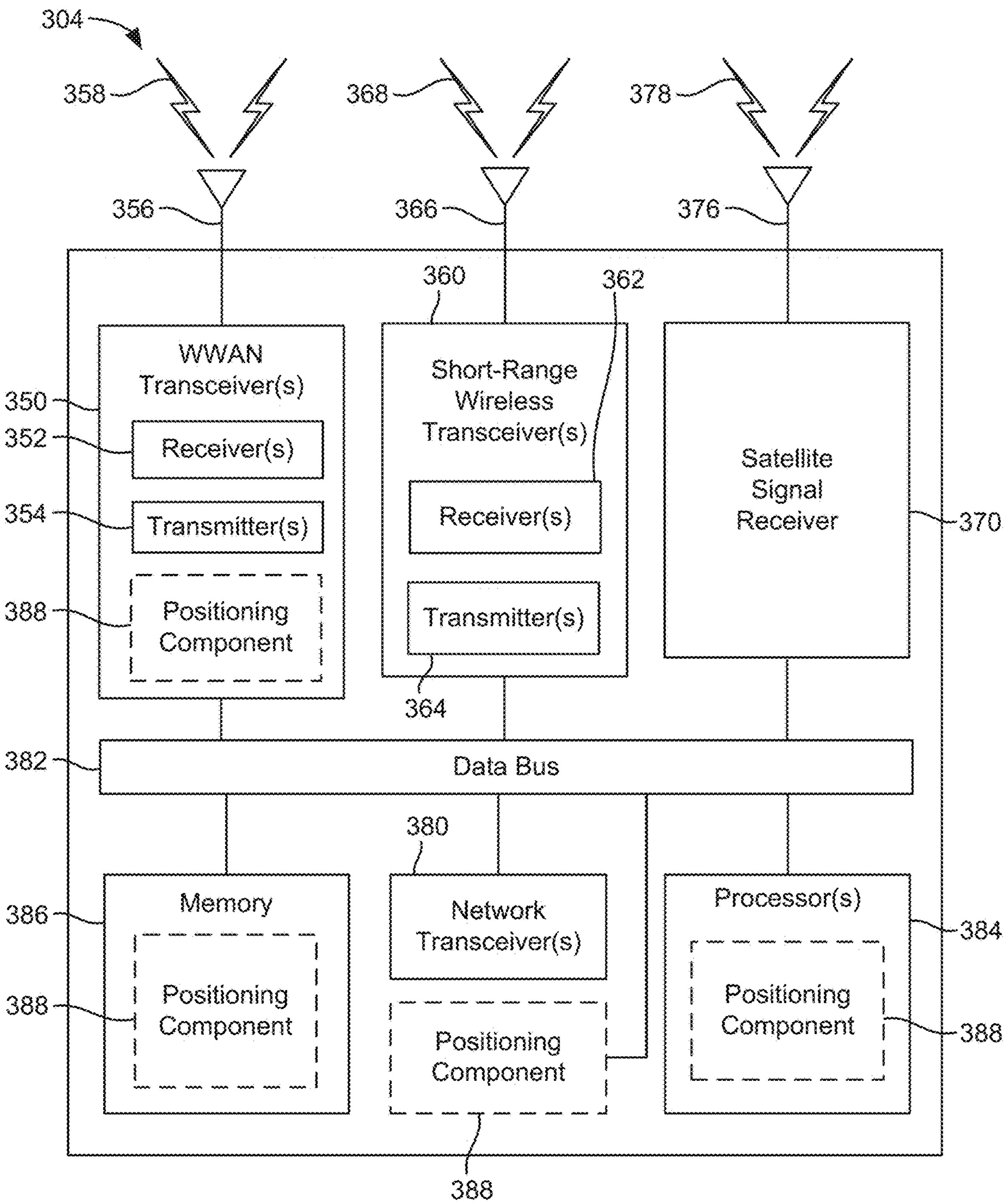
Figure 3C:
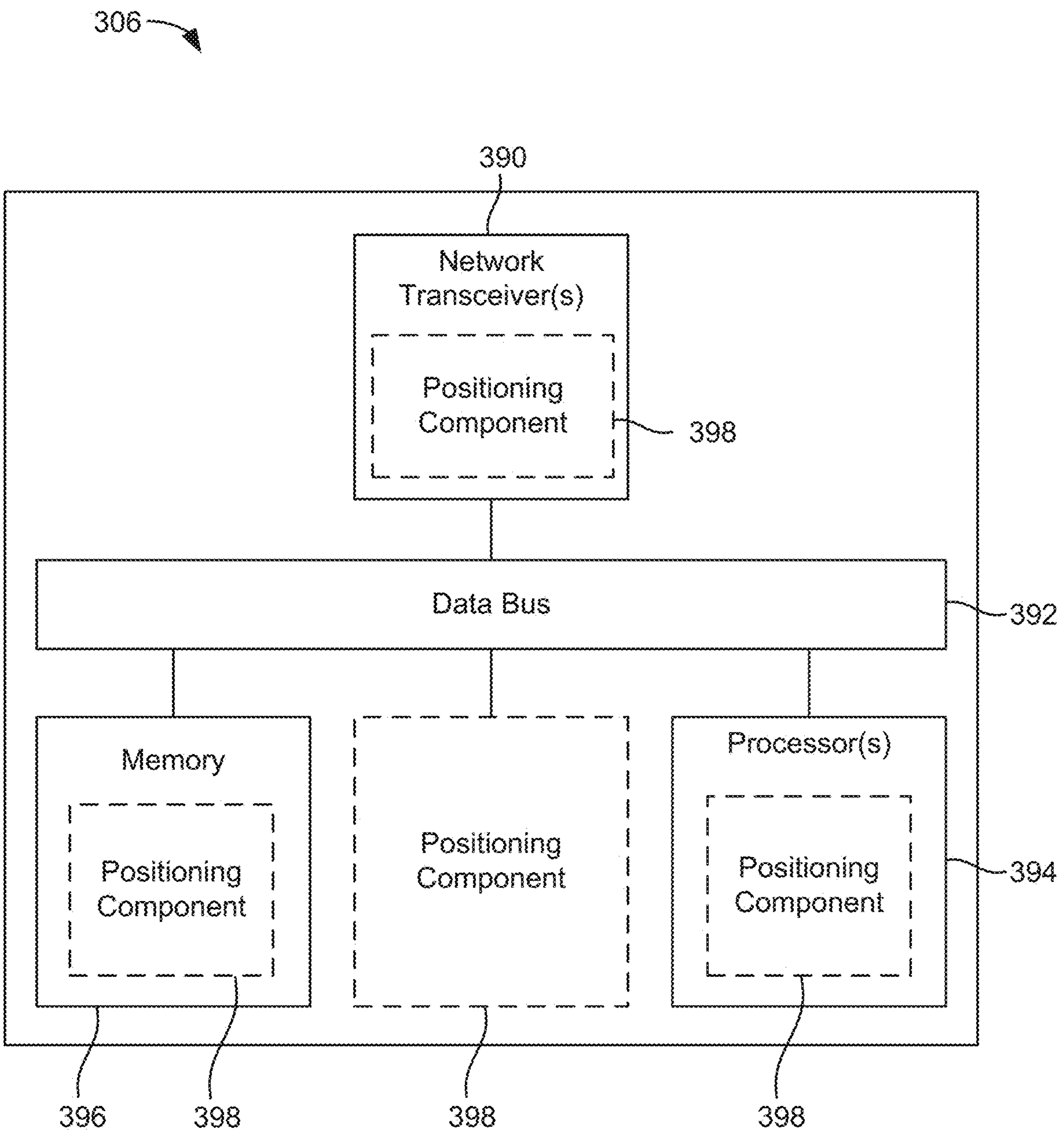

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more WWAN transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WI-FI® local area network, LTE-D, BLUETOOTH® short-range wireless technology, Zigbee®, Z-Wave®, PC5, DSRC, wireless access for vehicular environments (WAVE), near-field communication (NFC), etc.) over a wireless communication medium of interest. The short-range wireless transceivers 320 and 360 may be variously configured for transmitting and encoding signals 328 and 368, respectively, and, conversely, for receiving and decoding signals 328 and 368, respectively. As specific examples, the short-range wireless transceivers 320 and 360 may be WI-FI® local area network transceivers, BLUETOOTH® short-range wireless technology transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be GPS signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are NTN receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a PDCP layer, a RLC layer, and a MAC layer. The one or more processors 384 may provide RRC layer functionality associated with broadcasting of system information (e.g., master information block (MiB), system information blocks (SIBs)), RRC connection control (e.g., RRC connection paging, RRC connection establishment, RRC connection modification, and RRC connection release), inter-RAT mobility, and measurement configuration for UE measurement reporting, PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have WI-FI® local area network and/or BLUETOOTH® short-range wireless technology capability without cellular capability), or may omit the short-range wireless transceiver (s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a WI-FI® local area network "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station." "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WI-FI® local area network).

Figure 4:
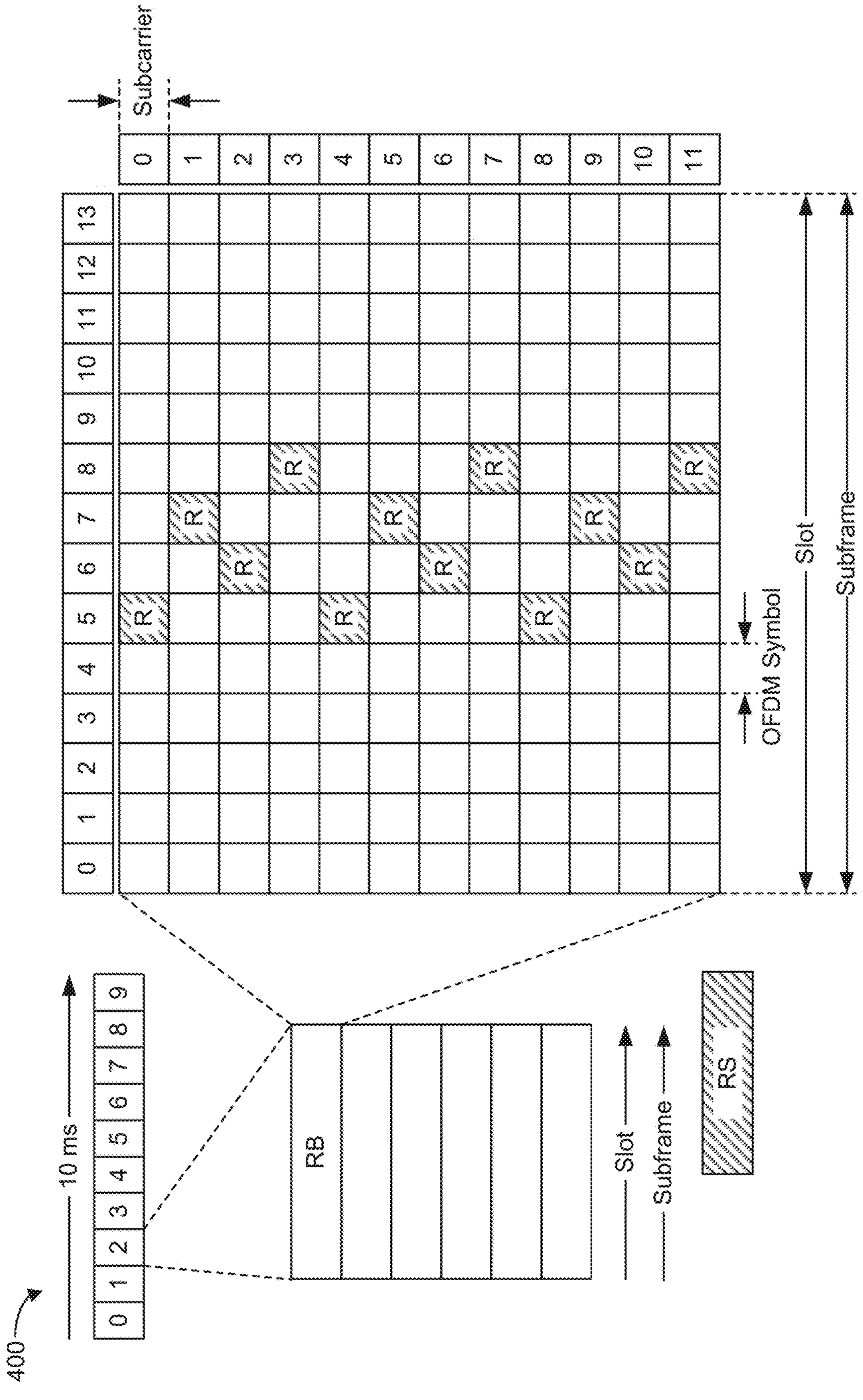
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), SSBs, SRS, etc., depending on whether the illustrated frame structure is used for uplink or downlink communication. FIG. 4 illustrates example locations of REs carrying a reference signal (labeled "R").

A collection of REs that are used for transmission of PRS is referred to as a "PRS resource." The collection of REs can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols, 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}(as in the example of FIG. 4); 12-symbol comb-4: {0, 2, 1, 3, 0, 2, 1, 3, 0, 2, 1, 3}; 6-symbol comb-6: {0, 3, 1, 4, 2, 5}: 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240}slots, with $\mu$=0, 1, 2, 3. The repetition factor may have a length selected from {1, 2, 4, 6, 8, 16, 32}slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

NR is capable of supporting various sidelink ranging and positioning techniques. Sidelink-based ranging enables the determination of the relative distance(s) between UEs and optionally their absolute position(s), where the absolute position of at least one involved UE is known. This technique is valuable in situations where global navigation satellite system (GNSS) positioning is degraded or unavailable (e.g., tunnels, urban canyons, etc.) and can also enhance range and positioning accuracy when GNSS is available. Sidelink-based ranging can be accomplished using a three-way handshake for session establishment, followed by the exchange of positioning reference signals (PRS), and concluded by messaging to exchange measurements based on PRS transmission and receipt from peer UEs.

Sidelink ranging is based on calculating an inter-UE round-trip-time (RTT) measurement, as determined from the transmit and receive times of PRS (a wideband positioning signal defined in LTE and NR). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute position. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

Figure 5:
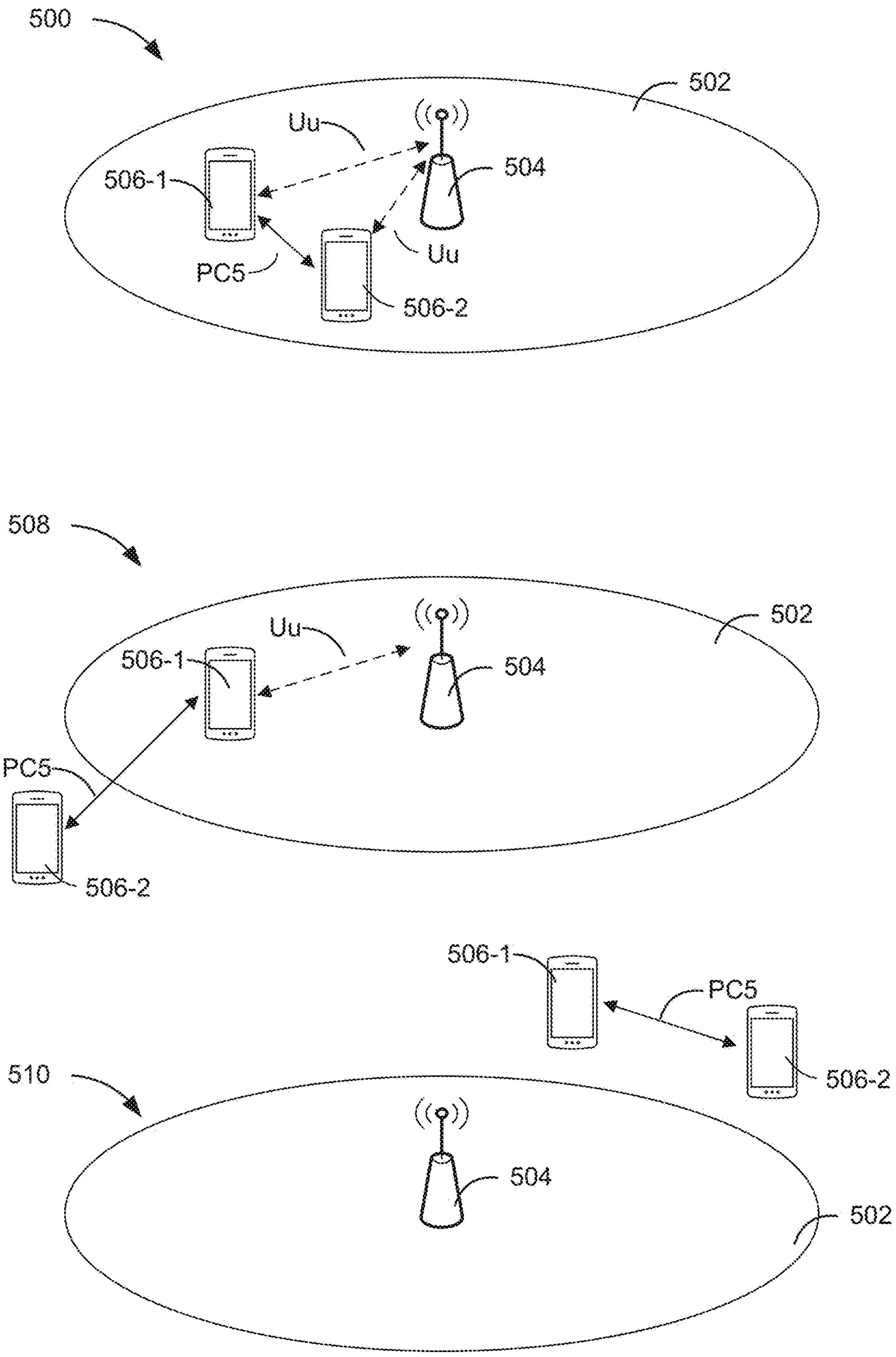
FIG. 5 shows example sidelink deployment scenarios in accordance with certain aspects of the disclosure.

Generally, there are multiple deployment scenarios for NR sidelink communication in terms of the relation between the sidelink communication and an overlaid cellular network. FIG. 5 shows three such deployment scenarios in accordance with certain aspects of the disclosure. Deployment scenario 500 shows an in-coverage scenario in which both UE 506-1 and UE 506-2 are within the coverage 502 of a base station 504 and communicate with the base station 504 via Uu links. In deployment scenario 500, the UEs 506-1 and 506-2 communicate with one another via a PC5 link. To a smaller or larger extent, depending on the exact mode-of-operation of the UEs 506-1 and 506-2, the base station 504 may control the sidelink communications. Deployment scenario 508 shows a partial coverage scenario in which UE 506-1 is within coverage 502 and communicates with the base station 504 over a Uu link. In deployment scenario 508, the UEs 506-1 and 506-2 are within the communication range of one another and communicate via a PC5 link. In an aspect. UE 506-1 may act as a relay for communications between the base station 504 and UE 506-2. Deployment scenario 510 shows out-of-coverage operation in which neither UE 506-1 nor UE 506-2 are within coverage 502 but are nevertheless within communication range of one another over a PC5 link.

Similar to downlink and uplink transmissions that take place over a Uu link, sidelink transmissions take place over a set of physical channels on which transport channels are mapped and/or which carry different types of L1/L2 control signaling. The physical channels include 1) a physical sidelink shared channel (PSSCH), 2) a physical sidelink control channel (PSCCH), 3) a physical sidelink broadcast channel (PSBCH), and 4) the physical sidelink feedback channel (PSFCH). The PSCCH carries control information in the sidelink. The PSSCH carries the data payload in the sidelink and additional control information. The PSBCH carries information for supporting synchronization in the sidelink. PSBCH is sent within a sidelink synchronization signal block (S-SSB). The PSFCH carries feedback related to the successful or failed reception of a sidelink transmission.

Furthermore, NR sidelink communications support various signals, including reference signals, that are carried in or associated with the physical channels. In this regard, a demodulation reference signal (DMRS) is used by a sidelink receiver for decoding the associated sidelink physical channel, i.e., PSCCH, PSSCH, PSBCH. The DMRS is sent within the associated sidelink physical channel. A sidelink primary synchronization signal (S-PSS) and sidelink secondary synchronization signal (S-SSS) may be used by a sidelink receiver to synchronize to the transmitter of these signals. S-PSS and S-SSS are sent within the S-SSB. Sidelink channel state information reference signals (SL CSI-RS) are used for measuring channel state information (CSI) at the receiver that is then fed-back to the transmitter. The transmitter adjusts its transmission based on the fed-back CSI. SL CSI-RS is sent within the PSSCH region of the slot. Sidelink Phase-tracking reference signals (SL-PTRS) are used for mitigating the effect of phase noise (in particular at higher frequencies) resulting from imperfections of the oscillator. SL-PTRS is sent within the PSSCH region of the slot. Sidelink positioning reference signals (SL-PRS) are used to conduct positioning operations to determine the absolute position of a sidelink device and/or the relative position of a sidelink device with respect to other sidelink devices. The SL-PRS is sent within the PSSCH region of the slot.

In NR, only certain time and frequency resources are (pre-)configured to accommodate SL transmissions. The subset of the available SL resources is (pre-)configured to be used by several UEs for their SL transmissions. This subset of available SL resources is referred to as a resource pool.

Figure 6:
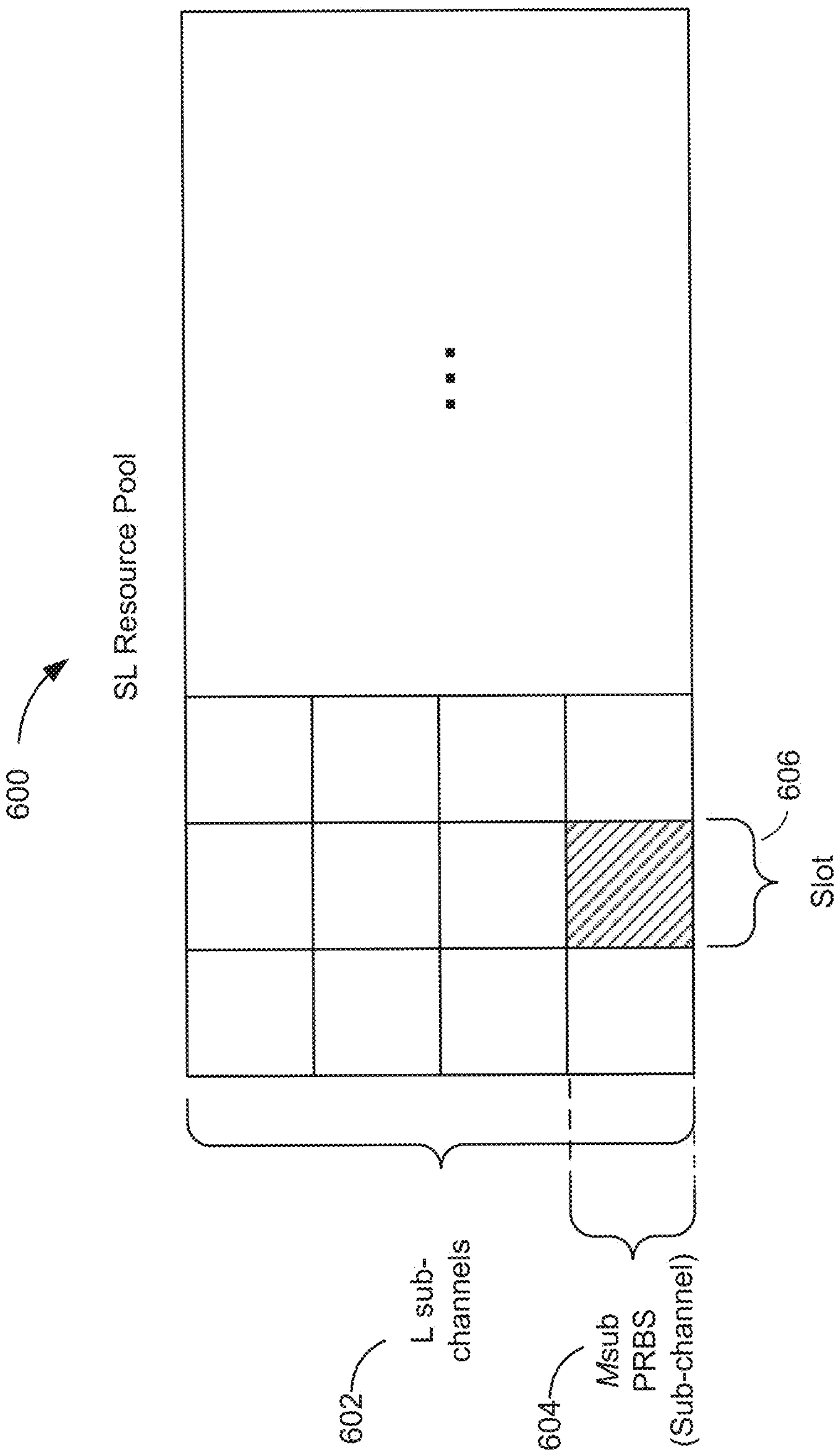
FIG. 6 shows an example resource pool in accordance with certain aspects of the disclosure.

FIG. 6 shows an example resource pool 600 in accordance with certain aspects of the disclosure. A resource pool consists of contiguous physical resource blocks (PRBs) and contiguous or non-contiguous slots that have been (pre-)configured for SL transmissions. In the frequency domain, a resource pool is divided into a (pre-)configured number L of contiguous sub-channels 602, where a sub-channel 604 consists of a group of consecutive PRBs in a slot 606. The number M sub of PRBs in a sub-channel corresponds to the sub-channel size, which is (pre-)configured within the resource pool 600. In an aspect, the sub-channel size M sub can be equal to 10, 12, 15, 20, 25, 50, 75, or 100 PRBs. A sub-channel represents the smallest frequency domain unit for a sidelink data transmission or reception. A sidelink transmission can use one or multiple sub-channels. In the time domain, the slots that are part of a resource pool are (pre-)configured and occur on a periodic basis. In the example of FIG. 6, sidelink resources are shown as individual resource pool elements, where each resource element consists of a single slot 606 over a sub-channel 604 comprised of a set of common physical resource blocks (PRBS).

In an aspect, the slot 606 of a sub-channel only allocates a subset of its consecutive symbols (pre-)configured for sidelink communications. The subset of SL symbols per slot is indicated with a starting symbol and a number of consecutive symbols, where these two parameters are (pre-) configured per the resource pool. The number of consecutive SL symbols can vary between 7 and 14 symbols depending on the physical channels which are carried within a slot.

Figure 7:
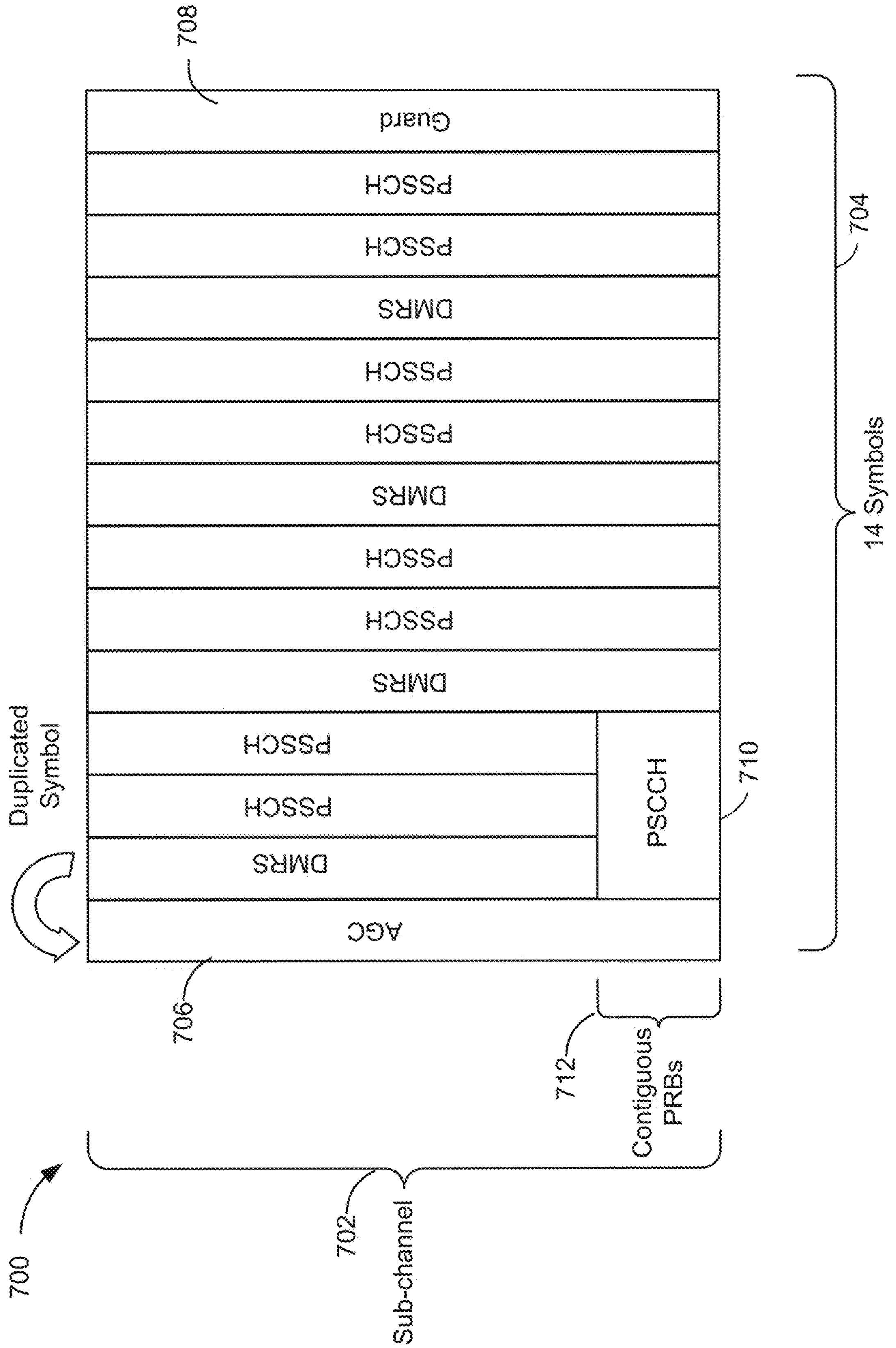
FIG. 7 depicts an example configuration of symbols of a sidelink resource for a slot of a sub-channel in accordance with certain aspects of the disclosure.

FIG. 7 depicts an example configuration of symbols of an SL resource 700 for a slot of a sub-channel in accordance with certain aspects of the disclosure. In this example, the configuration is directed to a single sub-channel 702 and a single slot 704. Here, slot 704 comprises 14 symbols including 3 PSCCH symbols and 12 PSSCH symbols. The example slot 704 includes 4 DMRS symbols which are carried in the PSSCH symbols. Among other data, the PSSCH carries the 1st-stage sidelink control information (SCI) as discussed in further detail herein. The first symbol carried by each PRB of the SL resource 700 is an automatic gain control (AGC) symbol 706, which is used by the sidelink device for automatic gain control operations. In an aspect, the AGC symbol 706 may be a duplicate of the second symbol carried by each PRB of the sub-channel in 702. The last symbol carried by each PRB of the SL resource 700 is a guard symbol 708, which does not carry any sidelink data. The SL resource 700 includes a configurable number of contiguous PRBs and symbols for carrying the PSSCH 710. In this example, the PSSCH 710 is carried in the second, third, and fourth symbols of a plurality of contiguous PRBs 712.

With reference again to FIG. 7, the SL resource 700 can be shared by several UEs for their SL transmissions. The SL resources of the SL resource 700 can be used for all transmission types (i.e., unicast, groupcast, and broadcast). A UE can be (pre-) configured with multiple resource pools for transmission (e.g., transmit resource pools (RPs)) and with multiple resource pools for reception (e.g., receive resource RPs). A UE can receive data on resource pools used for SL transmissions by other UEs and transmit on the SL using its transmit RPs. In certain aspects, exceptional transmit RPs are configured for the UEs that include when a UE is in a transition from idle to connected mode, when a UE experiences a link failure or a handover, or when a UE is changing between different configured transmit RPs. The use of exceptional transmit RPs in such situations aids in improving service continuity.

Another aspect of sidelink positioning is the configuration of sidelink resource pools for positioning (RP-Ps). The 12 symbols between the first symbol of a sidelink slot (for AGC) and the last symbol (the gap) in the time domain and the allocated sub-channel(s) in the frequency domain form a resource pool for sidelink transmission and/or reception. An RP-P can be configured within a resource pool specifically for positioning purposes. Each RP-P includes an offset, periodicity, number of consecutive symbols within a slot (e.g., as few as one symbol), and/or the bandwidth within a component carrier (or the bandwidth across multiple component carriers). In addition, each RP-P can be associated with a zone or a distance from a reference location.

A base station (or a UE) can assign, to another UE, one or more resource configurations from the RP-Ps. Additionally or alternatively, a UE (e.g., a relay or a remote UE) can request one or more RP-P configurations, and it can include in the request one or more of the following: (1) its location information (or zone identifier), (2) periodicity, (3) bandwidth, (4) offset, (5) number of symbols, and (6) whether a configuration with "low interference" is needed (which can be determined through an assigned QoS or priority).

Figure 8:
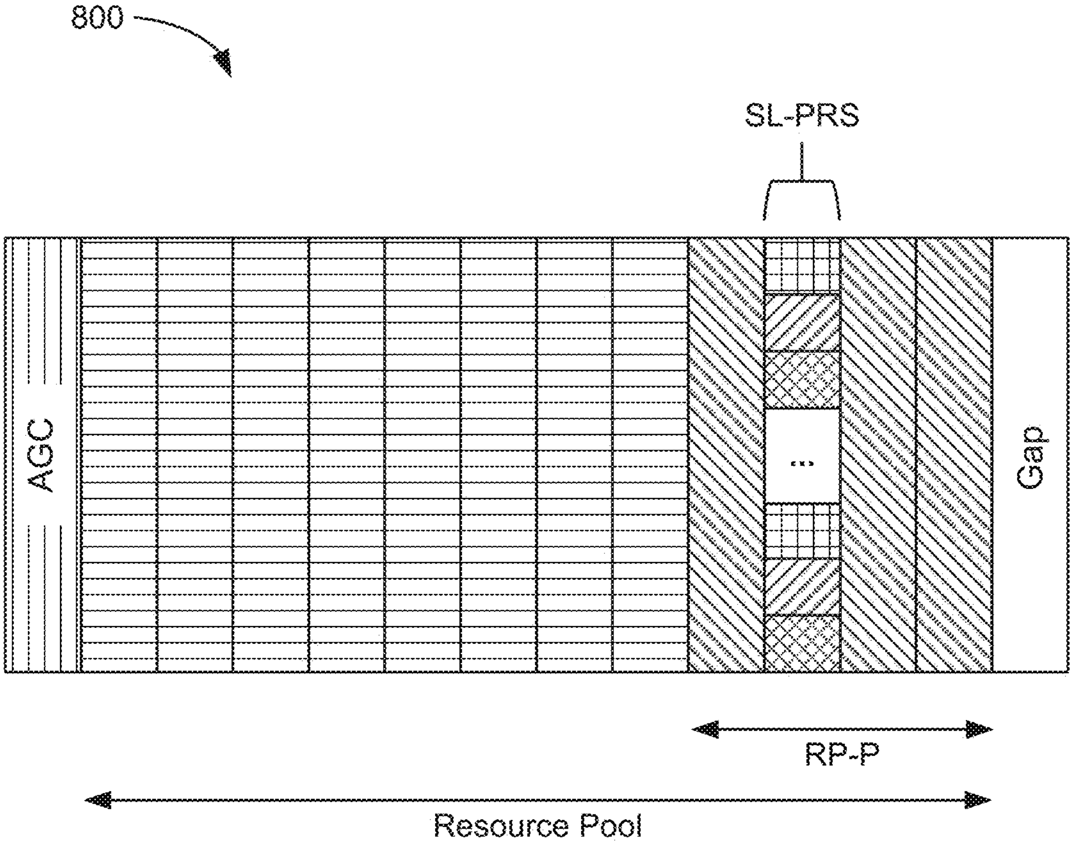
FIG. 8 is a diagram illustrating an example resource pool for positioning within a sidelink resource pool, according to aspects of the disclosure.

FIG. 8 is a diagram 800 illustrating an example of a RP-P within a sidelink resource pool, according to aspects of the disclosure. In the example of FIG. 8, time is represented horizontally and frequency is represented vertically. In the time domain, the length of each block is an OFDM symbol, and the 14 symbols make up a slot. In the frequency domain, the height of each block is a sub-channel.

In the example of FIG. 8, the entire slot (except for the first and last symbols) can be a resource pool for sidelink transmission and/or reception. That is, any of the symbols other than the first and last can be allocated for transmission and/or reception. However, an RP-P for sidelink transmission/reception is allocated in the last four pre-gap symbols of the slot. As such, non-sidelink positioning data, such as user data. CSI-RS, and control information, can only be transmitted in the first eight post-AGC symbols and not in the last four pre-gap symbols to prevent a collision with the configured RP-P. The non-sidelink positioning data that would otherwise be transmitted in the last four pre-gap symbols can be punctured or muted, or the non-sidelink data that would normally span more than the eight post-AGC symbols can be rate matched to fit into the eight post-AGC symbols.

SL-PRS have been defined to enable sidelink positioning procedures among UEs. Like a downlink PRS (DL-PRS), an SL-PRS resource is composed of one or more REs (i.e., one OFDM symbol in the time domain and one subcarrier in the frequency domain). SL-PRS resources have been designed with a comb-based pattern to enable FFT-based processing at the receiver. SL-PRS resources are composed of unstaggered, or only partially staggered, REs in the frequency domain to provide small ToA uncertainty and reduced overhead of each SL-PRS resource. SL-PRS may also be associated with specific RP-Ps (e.g., certain SL-PRS may be allocated in certain RP-Ps). SL-PRS have also been defined with intra-slot repetition (not shown in FIG. 8) to allow for combining gains (if needed). There may also be inter-UE coordination of RP-Ps to provide for dynamic SL-PRS and data multiplexing while minimizing SL-PRS collisions.

Even when there is no traffic being transmitted from the network to a UE, the UE is expected to monitor every downlink subframe on the PSCCH. This means that the UE has to be "on," or active, all the time, even when there is no traffic, since the UE does not know exactly when the network will transmit data for it. However, being active all the time is a significant power drain for a UE.

To address this issue, a UE may implement discontinuous reception (DRX) techniques. DRX is a mechanism in which a UE goes into a "sleep" state for configured DRX off times and "wakes up" for configured DRX on-times. During the DRX on-times, the UE checks to see if there is any data coming from the network, and if there is not, goes back into the sleep state. Legacy UEs are expected to wake-up during all DRX on-times as specified in their corresponding DRX configurations. In NR, however, a network node (e.g., base station, anchor UE, etc.) can transmit a wake-up signal (WUS) to a UE during a monitoring window ahead of a DRX on-time.

Whether a UE is to wake-up or remain in the sleep state during a DRX on-time in response to receiving or not receiving the WUS depends on the DRX configuration of the UE. In an aspect, the UE may be configured to wake-up during a DRX on-time in response to receiving a WUS in a WUS monitoring window occurring prior to and outside of the DRX on-time. In an aspect, the UE may be configured to remain in the sleep state during a DRX on-time in response to receiving the WUS. In an aspect, the UE may be configured to wake-up during a DRX on-time if a WUS is not received in the WUS monitoring window. In an aspect, the UE may be configured to remain in the sleep state during a DRX on-time if a WUS is not received.

Figure 9:
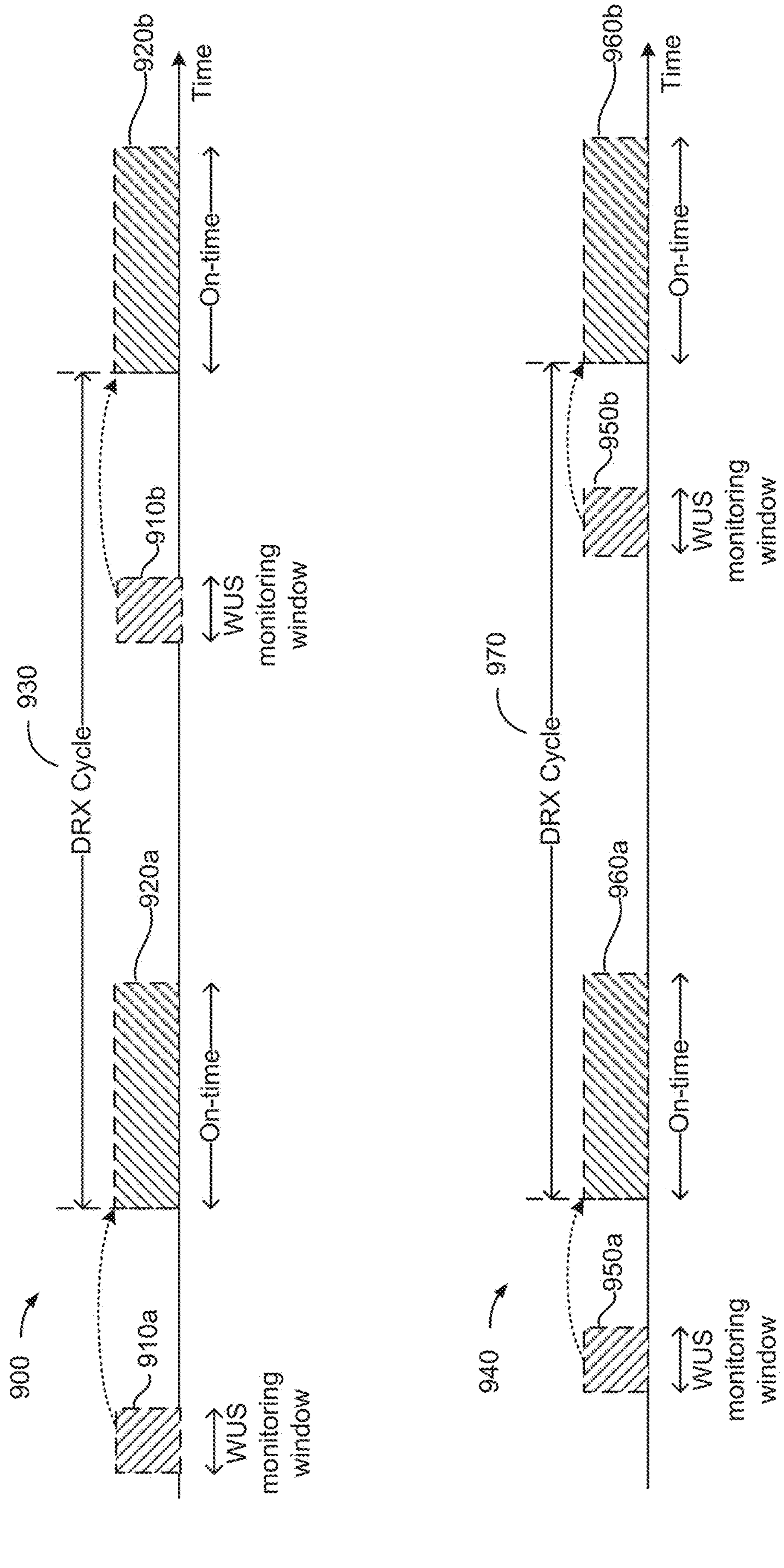
FIG. 9 is a simplified timing diagram of wake-up signals and discontinuous reception mode (DRX) on-times.

FIG. 9 shows simplified timing diagrams of two DRX configurations that are respectively associated with two different UEs. Each DRX configuration uses a WUS and indicates a WUS monitoring window, a DRX on-time, and a DRX cycle (e.g., the period between successive on-times). Here, the first UE is configured with a first DRX configuration having a DRX cycle 930 indicating the time between successive DRX on-times 920*a* and 920*b*. In accordance with the first DRX configuration, the first UE monitors for reception of a WUS during the WUS monitoring window 910*a* to determine whether the first UE is to wake-up or remain in the sleep state during DRX on-time 920*a* (as indicated by the first DRX configuration). Similarly, the first UE monitors for reception of a WUS during the WUS monitoring window 910*b* to determine whether the first UE is to wake-up or remain in the sleep state during DRX on-time 920*b* (as indicated by the first DRX configuration).

In diagram 940, the second UE is configured with a second DRX configuration having a DRX cycle 970 indicating the time between successive DRX on-times 960*a* and 960*b*. In accordance with the second DRX configuration, the second UE monitors for reception of a WUS during the WUS monitoring window 950*a* to determine whether the first UE is to wake-up or remain in the sleep state during DRX on-time 960*a* (as indicated by the second DRX configuration). Similarly, the second UE monitors for reception of a WUS during the WUS monitoring window 950*b* to determine whether the second UE is to wake-up or remain in the sleep state during DRX on-time 960*b* (as indicated by the first DRX configuration).

In the example shown in FIG. 9, the DRX on-times 920*a* and 920*b* of the first DRX configuration overlap the DRX on-times 960*a* and 960*b* of the second DRX configuration. However, the WUS monitoring windows 910*a* and 910*b* of the first DRX configuration occur at different times than the WUS monitoring windows 950*a* and 950*b* of the second DRX configuration. In certain aspects, this difference in the DRX configurations may be used to allow a network node to transmit WUS at different times to independently control whether the UEs wake-up during the same DRX on-time or at different DRX on-times. In certain aspects, however, the WUS monitoring windows of the first DRX configuration and the second DRX configuration may be the same so that the same WUS may be used to control whether the UEs wake-up during the corresponding DRX on-times.

Figure 10:
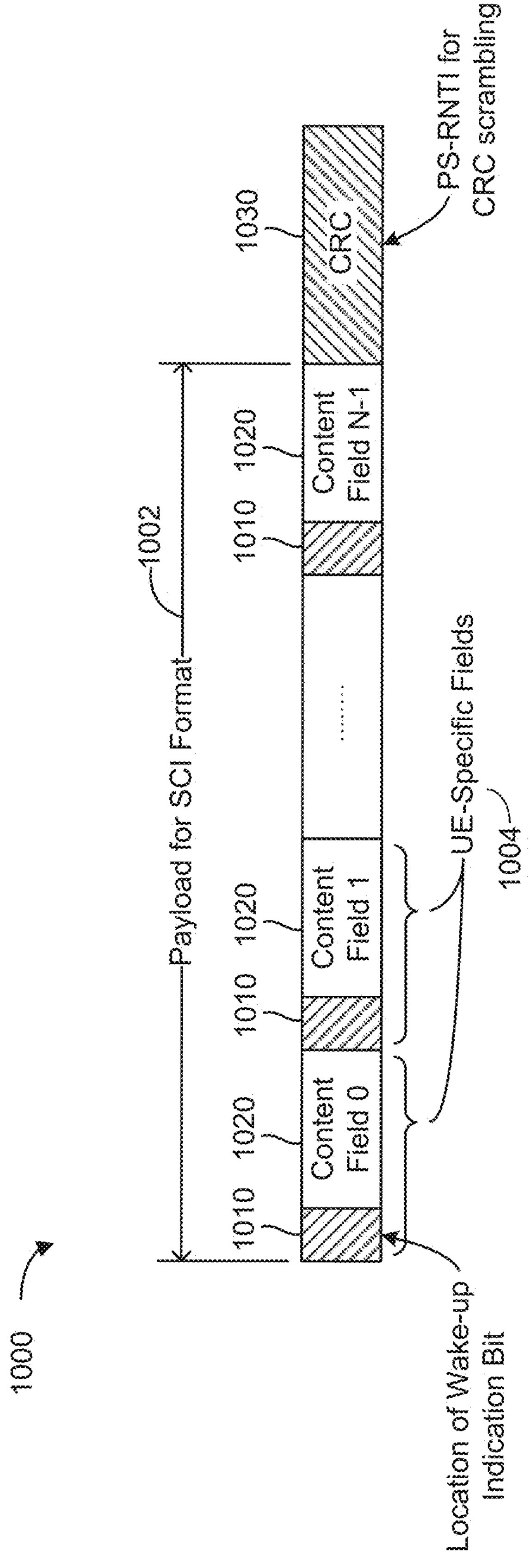
FIG. 10 illustrates an example sidelink control information (SCI) format for wake-up signals (WUS).

FIG. 10 illustrates an example SCI format for a WUS transmission 1000 that is used to control whether a UE is to wake-up during its configured DRX on-time. In accordance with certain aspects of the disclosure, the SCI format may be similar to downlink control information (DCI) Format 2-6 used in DRX configurations in Uu-linked nodes. Referring to FIG. 10, the WUS transmission 1000 may include an SCI payload 1002 including one or more UE-specific fields 1004. In accordance with certain aspects of the disclosure, each UE-specific field 1004 may include a wake-up indication 1010 (e.g., wake-up indication bit) and corresponding content field 1020. The WUS transmission 1000 may conclude with a cyclic redundancy check (CRC) 1030 corresponding to the SCI payload 1002. The WUS transmission 1000 can be shared by a group of UEs, with each UE in the group being assigned a UE-specific field in the SCI payload 1002. Specifically, each combination of WU indication 1010 and content field 1020 may correspond to a respective UE such that the SCI payload 1002 may be shared with multiple UEs. The WUS transmission 1000 may be a PSCCH message defined by the SCI format with the CRC 1030 scrambled by a PS-RNTI. Each of the WU indications 1010 may be a single bit indicating to the corresponding UE to wake-up for the corresponding (e.g., next) DRX on-time.

DRX configurations have only been defined for use in determining whether a UE is to wake-up for one or more communication operations, such as monitoring SCI, receiving sidelink data, or any combination thereof (e.g., monitor the PSCCH during the DRX on-time), or to skip (e.g., ignore) the corresponding DRX on-time and thus not conduct the one or more communication operations during the scheduled DRX on-time. Certain aspects of the disclosure are implemented with a recognition that a UE is expected to measure all PRS occasions, notwithstanding its DRX configuration for communications. If a UE needs to measure all PRS occasions, the UE needs to power on its RF receive chain and/or RF transmit chain for every occasion, which consumes power regardless of the DRX configuration used for communication operations.

Based on this observation, among other things, certain aspects of the disclosure are directed to DRX configurations that are explicitly directed to waking up a UE to conduct one or more sidelink positioning operations. In accordance with certain aspects of the disclosure, a UE receives at least one DRX configuration. The at least one DRX configuration indicates at least a DRX on-time and a WUS monitoring window for the reception of a WUS. In accordance with the aspects of the disclosure, the WUS is configured for use in determining whether the UE is to wake-up for sidelink positioning operations. In an aspect, the UE transitions from a sleep state to a wake-up state during the DRX on-time to conduct one or more sidelink positioning operations dependent on whether the WUS is received during the WUS monitoring window.

The manner in which the UE responds to the reception of the WUS may be configured as part of the positioning DRX configuration. In accordance with certain aspects, the UE wakes up if it receives the WUS during the WUS monitoring window and stays in the sleep state if the WUS is not received during the WUS monitoring window. In accordance with certain aspects, the UE wakes up when the WUS is not received such that the reception of the WUS acts to prevent the UE from waking up. In this latter instance, the UE may conduct a pre-configured set of positioning operations when the WUS is not received during the WUS monitoring window. The pre-configured positioning operations may be received by the UE from another network node or pre-configured in a standalone manner based on positioning operations defined in a standard, such as 3GPP. In accordance with certain aspects, the UE remains in the sleep state during the DRX on-time when the UE is not available for sidelink positioning operations independent of whether the WUS is received during the WUS monitoring window.

The WUS for positioning may be implemented in various manners. In accordance with certain aspects, the WUS for positioning may be consolidated with the legacy WUS used for communication such that the WUS for communication also functions as the WUS for positioning. For example, the legacy WUS may be extended with one or more additional fields indicating that the WUS is also to be associated with waking up the UE for positioning operations. Additionally, or in the alternative, a single WUS transmission may include separate WUS for positioning and communication. Additionally, or in the alternative, the WUS for positioning and the WUS for communication may be received in separate WUS transmissions. In certain aspects, fields following the wake-up indication bit may indicate the sidelink positioning operations that are to be conducted by the UE during the next positioning DRX on-time.

In certain aspects, the positioning WUS may indicate that the UE is to remain awake or go to sleep during a time window T and need not monitor for additional positioning WUS during the time window. This provides for additional power savings by the UE since the UE need not monitor for positioning WUS during the time window T.

The positioning DRX configuration may be configured as part of a sidelink resource pool. In an aspect, the DRX configuration is configured as part of a sidelink resource pool configuration. In an aspect, the DRX configuration is configured as part of a sidelink positioning resource pool configuration that is dedicated to sidelink positioning resources (see, e.g., FIG. 8).

A range of sidelink positioning operations may be conducted by the UE during the positioning DRX on-time. For example, such sidelink positioning operations may include 1) reporting sidelink positioning capabilities, 2) receiving a sidelink positioning resource signal (SL-PRS) configuration for a positioning session, 3) measuring one or more SL-PRS, 4) reporting one or more SL-PRS measurements, 5) configuring one or more SL-PRS resources for transmitting one or more SL-PRS, 6) transmitting one or more SL-PRS on one or more SL-PRS resources, 7) reporting transmission of the one or more SL-PRS, or 8) any combination thereof.

In accordance with certain aspects of the disclosure, a network node (e.g., base station, anchor UE, sidelink UE, etc.) may configure the positioning DRX configuration of one or more UEs. In an aspect, the network node transmits at least one DRX configuration to the one or more UEs. The DRX configuration indicates a DRX on-time and a WUS monitoring window for receiving a WUS. The wake-up signal is indicated by the DRX configuration for determining whether the one or more UEs are to wake-up for sidelink positioning operations. In an aspect, a network node may transmit a WUS during the WUS monitoring window indicated by the DRX configuration. The wake-up signal is transmitted dependent on whether the one or more UEs are to wake-up during the DRX on-time for conducting one or more sidelink positioning operations.

In accordance with certain aspects of the disclosure, the network node is an anchor UE, which transmits the DRX configuration to a first set of one or more UEs associated with a first common UE group formed by the anchor UE. The anchor UE also transmits a further DRX configuration to a second set of one or more UEs associated with a second common UE group formed by the anchor UE. The further DRX configuration indicates a further DRX on-time and a further WUS monitoring window for receiving a further WUS. The further WUS is indicated for use in waking up the second set of one or more UEs for sidelink positioning operations In accordance with certain aspects of the disclosure, the network node is a base station, which transmits the DRX to a first set of one or more UEs associated with a first common UE zone formed by the base station. The base station also transmits a further DRX configuration to a second set of one or more UEs associated with a second common UE zone formed by the base station. The further DRX configuration indicates a further DRX on-time and a further WUS monitoring window for receiving a further WUS. The further WUS is indicated for use in waking up the second set of one or more UEs for sidelink positioning operations.

Figure 11:
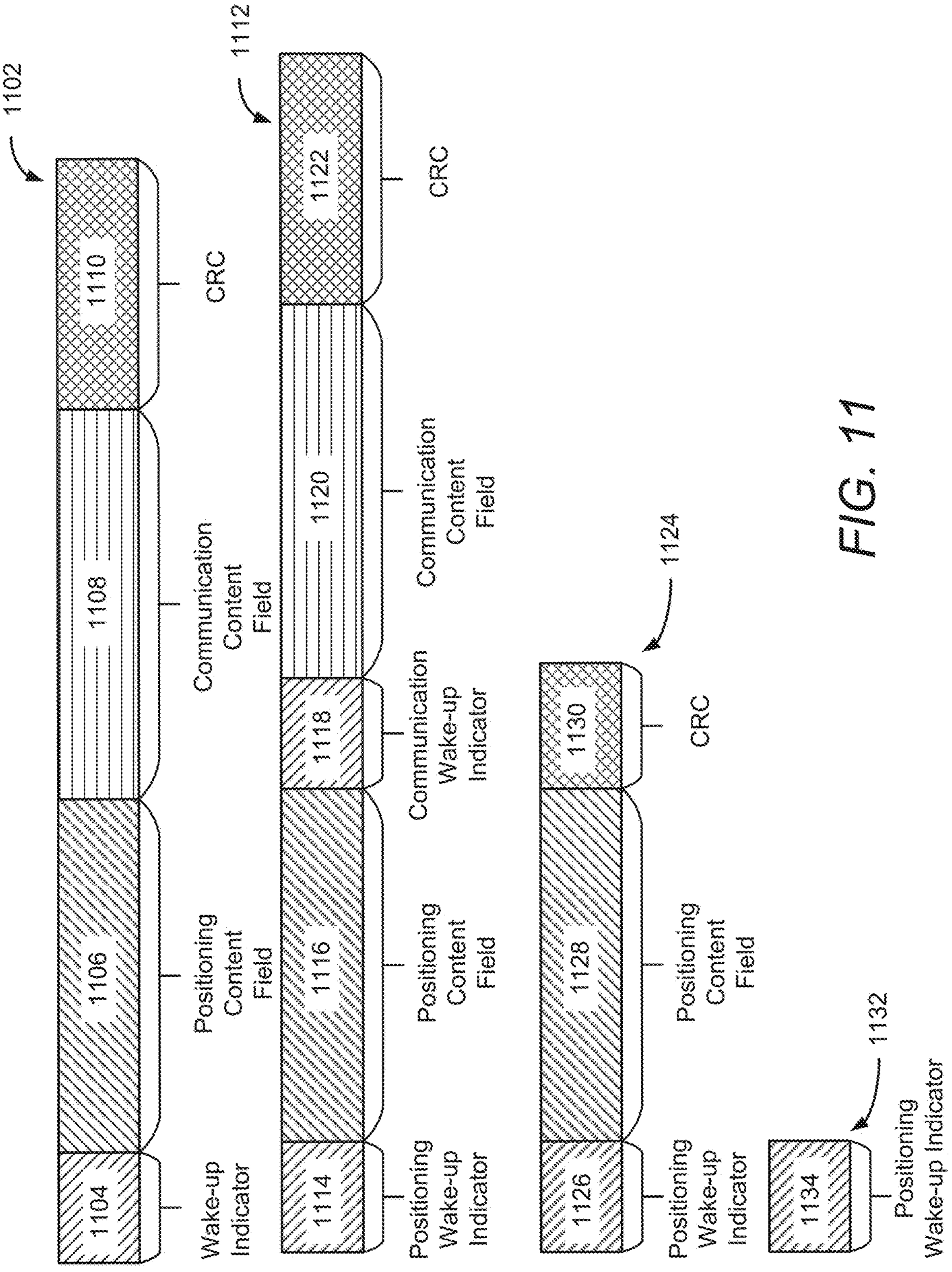
FIG. 11 shows various examples of WUS transmissions that are dedicated to waking up a UE for conducting positioning operations or that otherwise include WUS that are indicated for waking up the UE for positioning operations, according to aspects of the disclosure.

FIG. 11 shows various examples of WUS transmissions that are dedicated to waking up a UE for conducting positioning operations or that otherwise include WUS that are indicated for waking up the UE for positioning operations, according to aspects of the disclosure. WUS transmission 1102 illustrates how a legacy communication WUS may be extended so that the WUS may also be used in waking up a UE for positioning operations. In this example, WUS transmission 1102 includes a wake-up indicator 1104, a positioning content field 1106, a communication content field 1108, and a CRC 1110. In certain aspects, the wake-up indicator 1104 of WUS transmission 1102 applies to waking up the UE for both communication operations and positioning operations. In accordance with certain aspects of the disclosure, the positioning content field 1106 includes the information indicating whether the UE is to wake-up to conduct positioning operations during the next occurring positioning DRX on-time while the communication content field 1108 includes the information indicating whether the UE is to wake-up to conduct communication operations during the next communication DRX on-time. Additionally, or in the alternative, the positioning content field 1106 may indicate the particular positioning operations that the UE is to conduct during the next occurring positioning DRX on-time and/or the communication content field 1108 may include information indicating the communication operations that are to be executed by the UE during the next occurring communication DRX on-time. In certain aspects, the positioning DRX on-time may coincide with the communication DRX on-time (e.g., a single DRX on-time is used for both communication and positioning or are defined separately but completely overlap one another and have the same duration). In certain aspects, the positioning DRX on-time is different than the communication DRX on-time (e.g., the DRX on-times are defined separately and do not overlap or only partially overlap).

WUS transmission 1112 is an example transmission that includes separate wake-up indicators respectively associated with waking up the UE for positioning operations and communication operations according to aspects of the disclosure. In this example, WUS transmission 1112 includes a positioning wake-up indicator 1114 that is used by the UE to determine whether the UE is to wake-up to conduct positioning operations during a subsequently occurring positioning DRX on-time. The positioning wake-up indicator 1114 is followed by a positioning content field 1116, which may include information such as an indication of the positioning operations that are to be executed by the UE during the subsequently occurring positioning DRX on-time. WUS transmission 1112 also includes a communication wake-up indicator 1118 used by the UE to determine whether the UE is to wake-up to conduct communication operations during a subsequently occurring positioning DRX on-time. The communication wake-up indicator 1118 is followed by a communication content field 1120, which may include information such as an indication of the communication operations that are to be executed during the subsequently occurring communication DRX on-time. In certain aspects, the positioning DRX on-time may coincide with the communication DRX on-time (e.g., a single DRX on-time is used for both communication and positioning or are defined separately but completely overlap one another and have the same duration). In certain aspects, the positioning DRX on-time is different than the communication DRX on-time (e.g., the DRX on-times are defined separately and do not overlap or only partially overlap). In certain aspects, The WUS transmission 1112 may terminate with a CRC 1122.

WUS transmission 1124 is an example WUS that is dedicated solely to waking up (or inhibiting wake-up) of the UE to conduct positioning operations. In this example, WUS transmission 1124 includes a positioning wake-up indicator 1126 that is used by the UE to determine whether the UE is to wake-up to conduct positioning operations during a subsequently occurring positioning DRX on-time. The positioning wake-up indicator 1126 is followed by a positioning content field 1128, which may include information such as an indication of the positioning operations that are to be executed by the UE during the subsequently occurring positioning DRX on-time. The WUS transmission 1124 may terminate with a CRC 1130.

WUS transmission 1132 is an example WUS that is likewise dedicated to solely waking up (or inhibiting wake-up) of the UE to conduct positioning operations. In this example, the WUS transmission 1132 is minimized by only including a positioning wake-up indicator 1134 without further wake-up content. To this end, WUS transmission 1132 only includes a positioning wake-up indicator 1134 that is used by the UE to determine whether the UE is to wake-up to conduct positioning operations during a subsequently occurring positioning DRX on-time.

Figure 12:
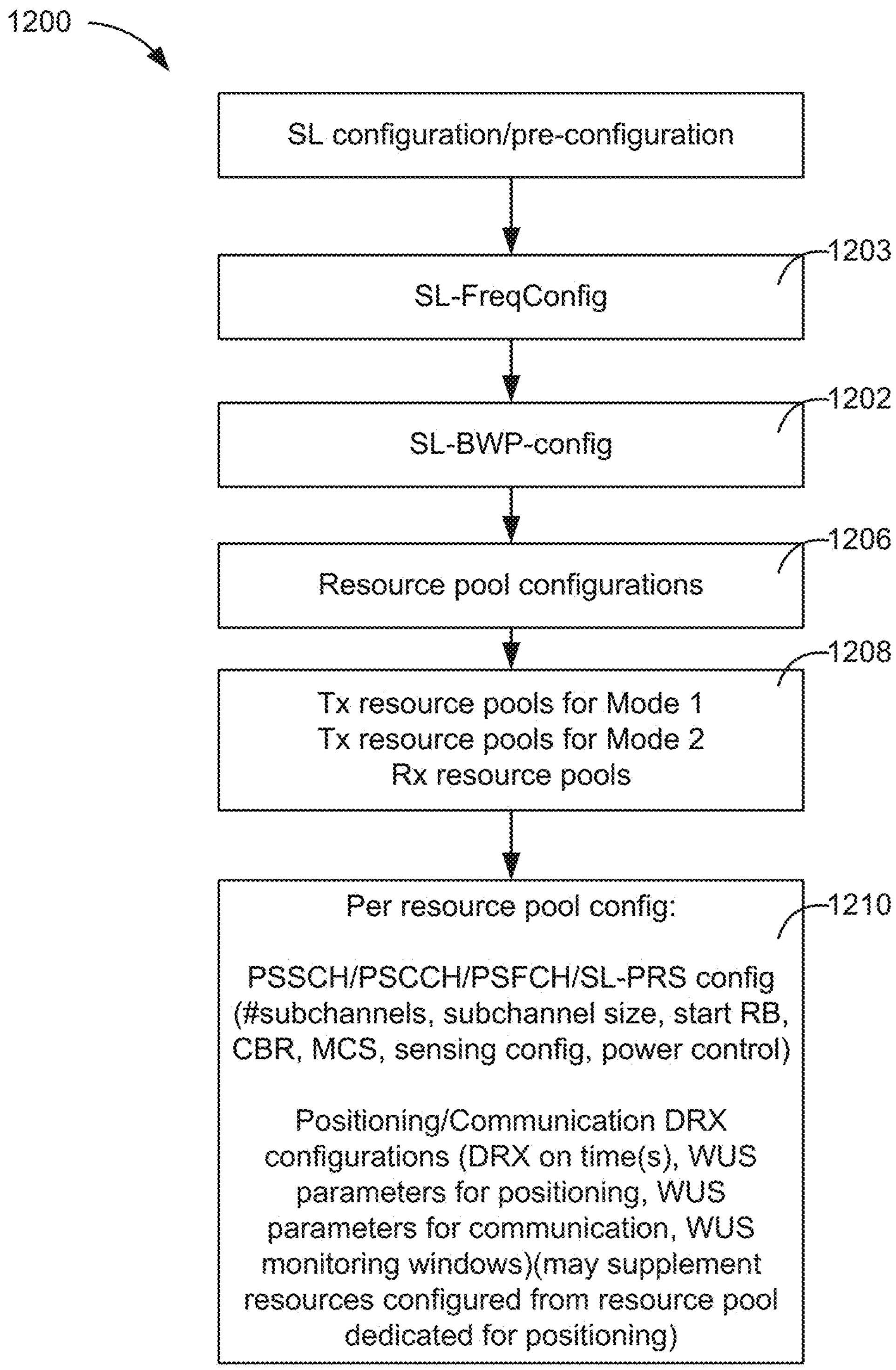
FIG. 12 shows an example of the elements of a sidelink configuration/pre-configuration that may include a positioning DRX configuration and corresponding WUS parameters as part of a general resource pool configuration, according to aspects of the disclosure.

The DRX configuration for a UE, including the WUS parameters, may be configured in the general resource pool configurations and/or in a resource pool dedicated for positioning. FIG. 12 shows an example of the elements of a sidelink configuration/pre-configuration 1200 that may include a positioning DRX configuration and corresponding WUS parameters as part of a general resource pool configuration, according to aspects of the disclosure. In this example, the sidelink bandwidth part (BWP) configuration 1202 is configured as part of the sidelink frequency configuration (SL-FreqConfig) 1203 and includes a plurality of resource pool configurations 1206. Example resource pool configurations are shown at block 1208 and may include transmission (Tx) resource pools for Mode 1 resource allocation, transmission (Tx) resource pools for Mode 2 resource allocation, and receive (Rx) resource pools. Each resource pool shown at block 1208 may include one or more of the example resource pool configurations shown at block 1210, including, for example, configurations for PSSCH, PSSCH, PSGCH, and SL-PRS. Each such configuration, in turn, may indicate the number of sub-channels, the sub-channel size, the start RB, the modulation coding scheme (MCS), the channel busy ratio (CBR), the sensing configuration, and the power control configuration. The resource pool configurations at block 1210 may also include the positioning DRX configuration that is used for waking up the UE for positioning operations and, in certain aspects, the communication DRX configuration that is used for waking up the UE for communication operations. In an aspect, the DRX configuration may include the WUS parameters for positioning, the positioning DRX on-time, the WUS parameters for communications, and the communication DRX on-time. In accordance with certain aspects of the disclosure, the parameters associated with the positioning DRX configuration may supplement parameters of one or more positioning DRX configurations included in a resource pool configuration dedicated to positioning.

Figure 13:
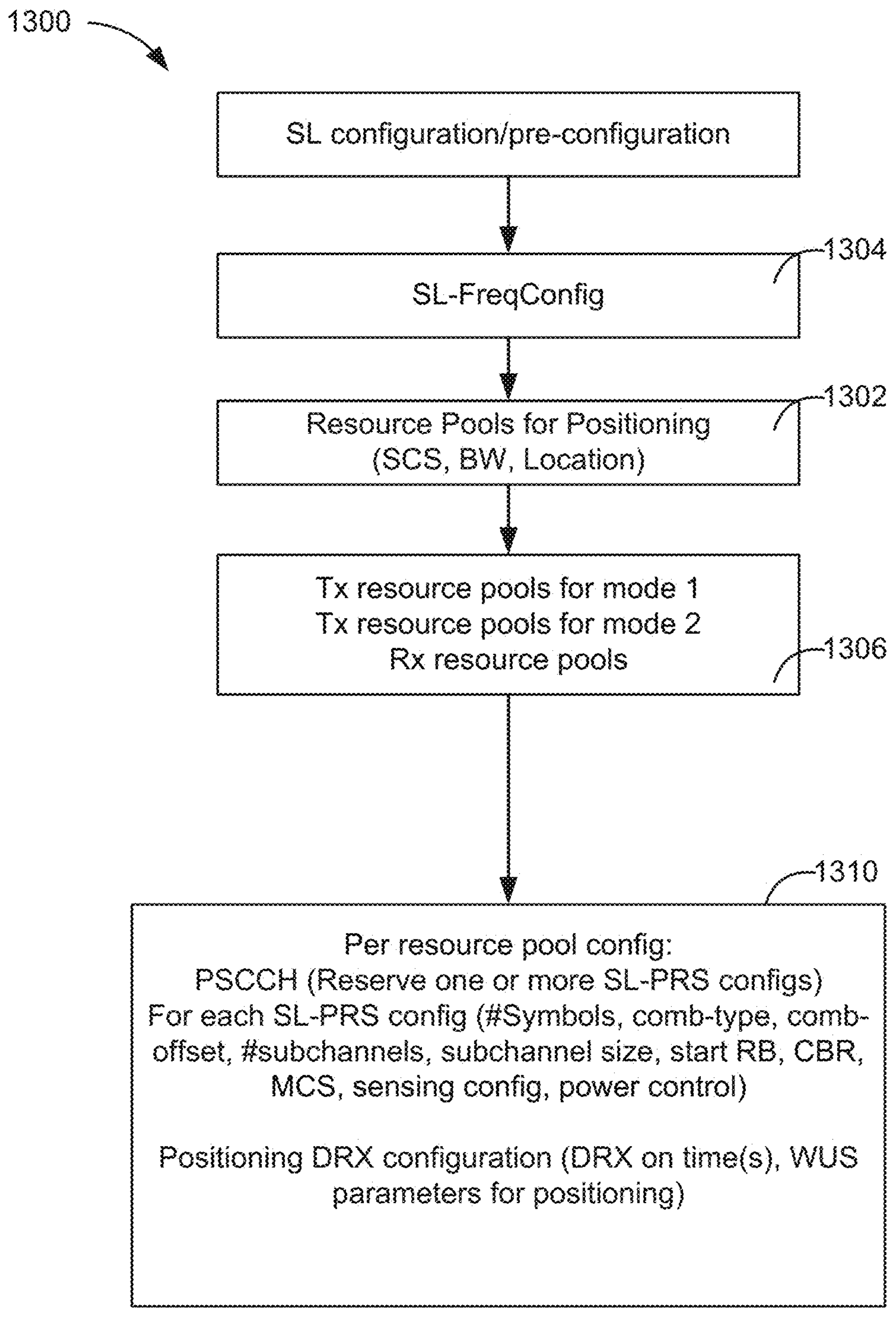
FIG. 13 shows an example of the elements of a sidelink configuration/pre-configuration having a dedicated positioning resource pool configuration that may include a positioning DRX configuration, according to aspects of the disclosure.

FIG. 13 shows an example of the elements of a sidelink configuration/pre-configuration 1300 having a dedicated positioning resource pool configuration that may include a positioning DRX configuration, according to aspects of the disclosure. Unlike the example shown in FIG. 12, the resource pools for positioning 1302 are configured as part of the sidelink frequency configuration (SL-FreqConfig) 1304, not the BWP. The resource pools for positioning 1302 may each have their own subcarrier spacing (SCS), bandwidth (BW), and frequency location. Example parameters associated with the resource pools for positioning 1302 are shown at block 1306 and may include transmission (Tx) positioning resource pools for Mode 1 operation, transmission (Tx) positioning resource pools for Mode 2 operation, and receive (Rx) positioning resource pools. Each positioning resource pool shown at block 1306 may include one or more of the example resource pool configurations shown at block 1310, including, for example, reservations of sidelink PRS (SL-PRS) configurations in the PSSCH, where each SL-PRS configuration includes the number of symbols, the comb-type, the comb-offset, the number of sub-channels, the sub-channel size, and thus starting RB. Each such configuration may also indicate the MCS, the CBR, the sensing configuration, and the power control configuration associated with the positioning resources. The resource pool configurations at block 1310 may also include the positioning DRX configuration that is used for waking up the UE for positioning operations. In an aspect, the positioning DRX configuration may include the WUS parameters for positioning, the WUS monitoring window(s), and the positioning DRX on-time(s).

In accordance with certain aspects of the disclosure, the positioning DRX configuration may be configured as part of the sidelink resource configuration (e.g., general sidelink configuration and/or positioning configuration dedicated to positioning) of the UE within a given band but be used for sidelink positioning resources that are not in the same band as the resources of the sidelink resource configuration. For example, the UE may be configured with a positioning DRX configuration in licensed spectrum while being indicated for waking up the UE for positioning operations (e.g., transmitting, measuring, receiving, SL-PRS) in unlicensed spectrum.

In accordance with certain aspects of the disclosure, a group of UEs may be configured with a common DRX configuration so that all UEs of the group wake-up (or are inhibited from waking up) for positioning based on the same WUS transmission. In certain aspects, the single DRX configuration may be dedicated to waking up the UEs for sidelink positioning or functioning in waking up the UEs for both sidelink positioning and communication operations. In certain aspects, each group of UEs may be configured with different DRX configurations so that only UEs of a given group wake-up (or are inhibited from waking up) for sidelink positioning based on the same WUS transmission. In certain aspects, the UEs may be grouped by zone identifiers (Zone IDs) assigned by one or more base stations. In such instances, the content fields of the WUS transmission may indicate the Zone IDs to which the WUS pertains. Additionally, or in the alternative, the UEs may be grouped with one another based on the UEs in a group having common metrics or other characteristics. In such instances, one or more fields of the WUS or the CRC of the WUS may include one or more Physical Sidelink Radio Network Temporary Identifiers (PS-RNTI) indicating the UEs to which the WUS is directed. In certain aspects, the positioning DRX configuration for each UE group may also be applicable to waking up the UEs within the UE group for communication operations.

Figure 14:
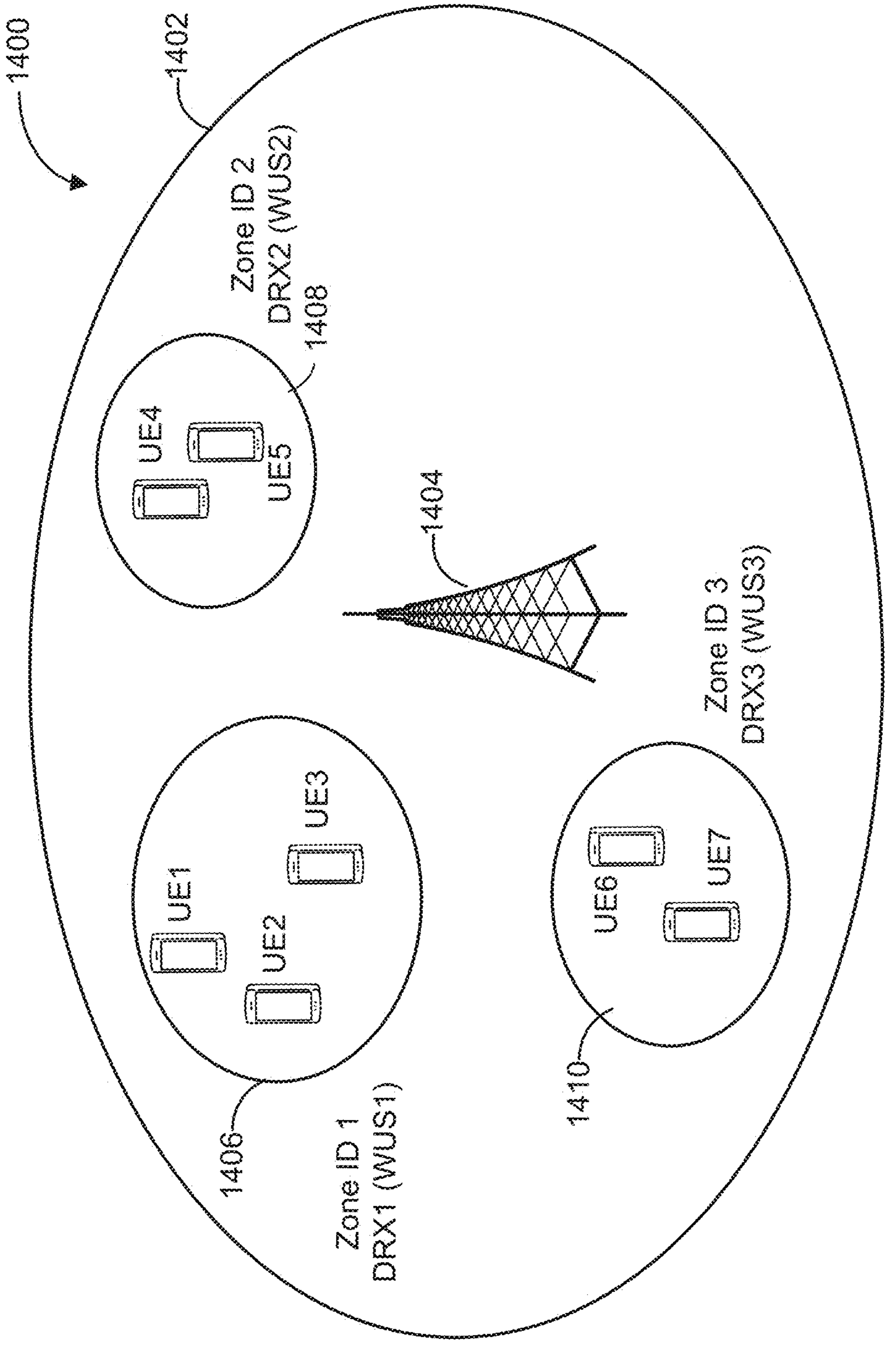
FIG. 14 shows an example of a communication environment in which different UE groups are assigned different positioning DRX configurations with different WUS parameters, according to aspects of the disclosure.

FIG. 14 shows an example of a communication environment 1400 in which different UE groups are assigned different positioning DRX configurations with different WUS parameters, according to aspects of the disclosure. In this example, all of the UEs are within a service area 1402 of a base station 1404 operating in, for example, FR2. Base station 1404 has grouped the UEs based on sidelink Zone IDs and assigned to each UE group within a sidelink Zone ID its own positioning DRX configuration associated with a respective WUS. Here, UE group 1406 includes UEs labeled UE1, UE2, and UE3, all of which have been assigned to Zone ID 1 by the base station 1404 and configured with positioning DRX configuration labelled DRX1. As such, all of the UEs of the UE group 1406 will wake-up (or be inhibited from waking up) for sidelink positioning operations in response to the same WUS transmission WUS1. UE group 1408 includes UEs labeled UE4 and UE5, which have been assigned to Zone ID 2 by the base station 1404 and configured with positioning DRX configuration labelled DRX2. As such, UE4 and UE5 will wake-up (or be inhibited from waking up) for sidelink positioning operations in response to the same WUS transmission WUS2. UE group 1410 includes UEs labeled UE6 and UE7, which have been assigned to Zone ID 3 by the base station 1404 and configured with positioning DRX configuration labelled DRX3. As such, UE6 and UE7 will wake-up (or be inhibited from waking up) for sidelink positioning operations in response to the same WUS transmission WUS3. In accordance with certain aspects, the base station 1404 transmits WUS to selectively wake-up the UEs within a given UE group for sidelink positioning operations while UEs in other zones remain idle during the same period for the sidelink positioning operations. In certain aspects, one or more fields within the transmitted WUS may indicate the Zone ID of the UEs to which the WUS is directed.

Figure 15:
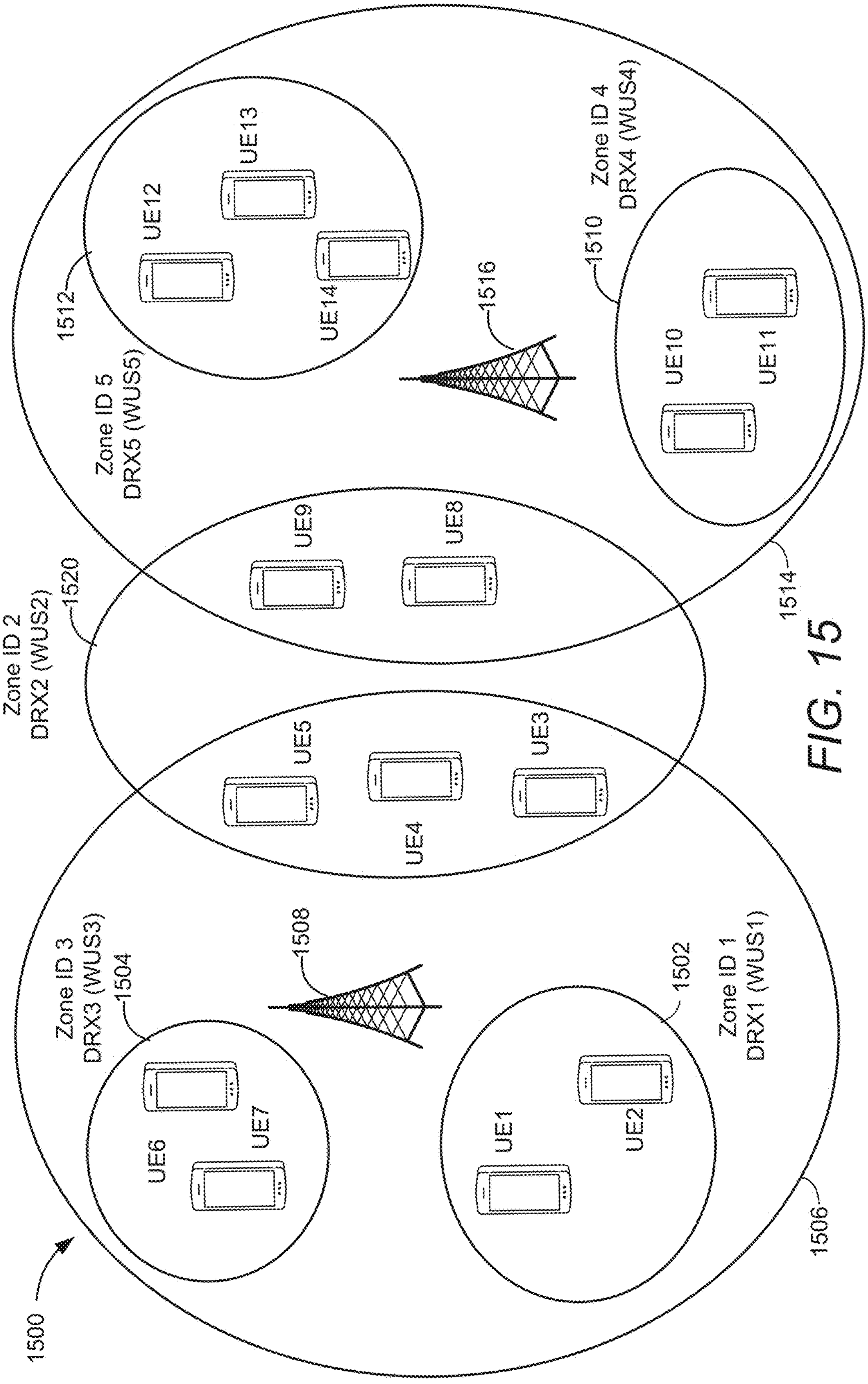
FIG. 15 shows another example of a communication environment in which different UE groups are assigned different positioning DRX configurations with different WUS parameters, according to aspects of the disclosure.

FIG. 15 shows another example of a communication environment 1500 in which different UE groups are assigned different positioning DRX configurations with different WUS parameters, according to aspects of the disclosure. In this example, UEs labeled UE1 and UE2 in UE group 1502 (assigned Zone ID 1 with a DRX configuration of DRX1 using WUS1) and UEs labeled UE6 and UE7 in UE group 1504 (assigned Zone ID 3 with a DRX configuration of DRX3 using WUS3) are within a service area 1506 of a base station 1508 operating in, for example, FR2. Similarly, UEs labeled UE10 and UE11 in UE group 1510 (assigned Zone ID 4 with a DRX configuration of DRX4 using WUS4) and UEs labeled UE12, UE13 and UE14 in UE group 1512 (assigned Zone ID 5 with a DRX configuration of DRX5 using WUS5) are within a service area 1514 of a base station 1516. However, the UEs labeled UE3. UE4, UE5. UE8, and UE9 in UE group 1520 (assigned Zone ID 2 with a DRX configuration of DRX2 using WUS2) are located in different service areas despite having the same Zone ID. In this example, UE3, UE4, and UE5 are within service area 1506 served by a base station 1508 while UE8 and UE9 are within service area 1514 served by base station 1516. In such instances, both base station 1508 and base station 1516 transmit WUS2 (e.g., concurrently) to wake-up the UEs in UE group 1520 for sidelink positioning operations that are to take place during the next occurring DRX on-time.

In accordance with certain aspects of the disclosure. Zone IDs could be clustered together so that UEs that are geographically nearby other UEs in multiple zones could have the same positioning DRX configuration and WUS parameters. Clustering allows easy monitoring of UEs within a broader neighborhood allowing handover across different gNBs/TRPs. Clustering could be configured by the base station based on network-level statistical metrics.

Figure 16:
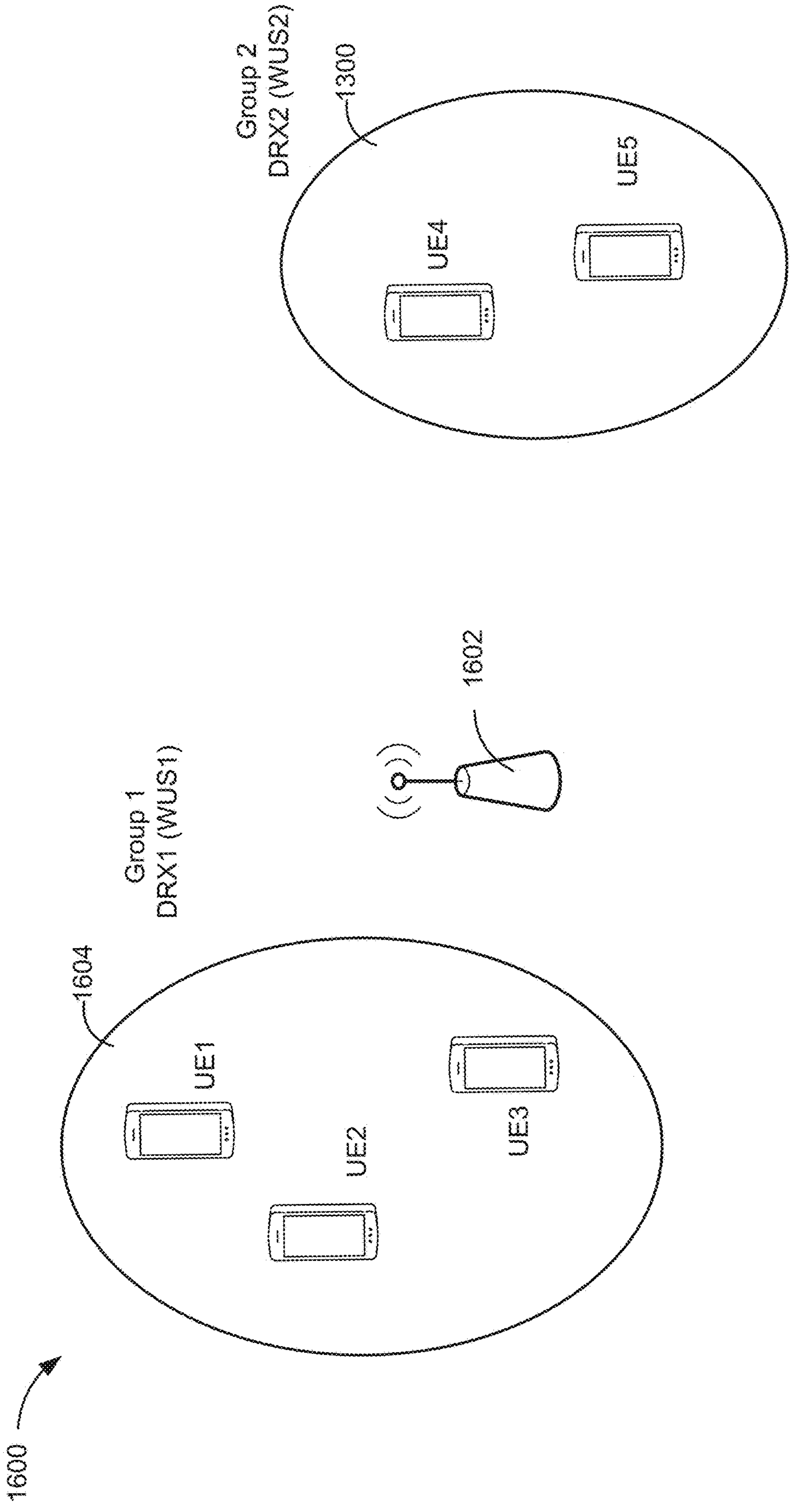
FIG. 16 shows another example of a communication environment in which different UE groups are assigned different positioning DRX configurations with different WUS parameters, according to aspects of the disclosure.

FIG. 16 shows another example of a communication environment 1600 in which different UE groups are assigned different positioning DRX configurations with different WUS parameters, according to aspects of the disclosure. In this example, all of the UEs are within an area covered by an anchor UE 1602 and may be grouped by the anchor UE 1602 based on measurement histories associated with the UEs. In an aspect, the UEs may be grouped based on quality of measurement characteristics, common UE signal characteristics, UE capabilities, or any combination thereof. For example, the UEs may be grouped based on reported line-of-sight (LOS) measurements, UE processing/positioning capabilities (e.g., some UEs may not be able to do specific measurements or meet reporting latency criteria, etc.), UE receive-transmit (Rx-Tx) measurements, reference signal time difference (RSTD) measurements, RSRP, path RSRP, multipath reporting, line-of-sight/non-line-of-sight (LOS/NLOS) estimators. ToA quality indication, angle-of-arrival (AoA) measurements, or any combination thereof.

In the illustrated example, anchor UE 1602 configures the UEs labeled UE1, UE2, and UE3 of UE Group 1604 with a positioning DRX configuration labelled DRX1, which is associated with WUS1. As such, all of the UEs of the UE group 1604 will wake-up (or be inhibited from waking up) for sidelink positioning operations in response to the same WUS transmission WUS1. UE Group 2 1606 includes UEs labeled UE4 and UE5, which have been configured with a positioning DRX configuration labelled DRX2, which is associated with WUS2. As such, UE4 and UE5 will wake-up (or be inhibited from waking up) for sidelink positioning operations in response to the same WUS transmission WUS2. In accordance with certain aspects, the anchor UE 1602 transmits WUS to selectively wake-up the UEs within a given UE group for sidelink positioning operations while UEs in other zones remain idle during the same period during the sidelink positioning operations. In certain aspects, one or more fields within the transmitted WUS may indicate the UE group or corresponding UE identifiers to which the WUS is directed.

Figure 17:
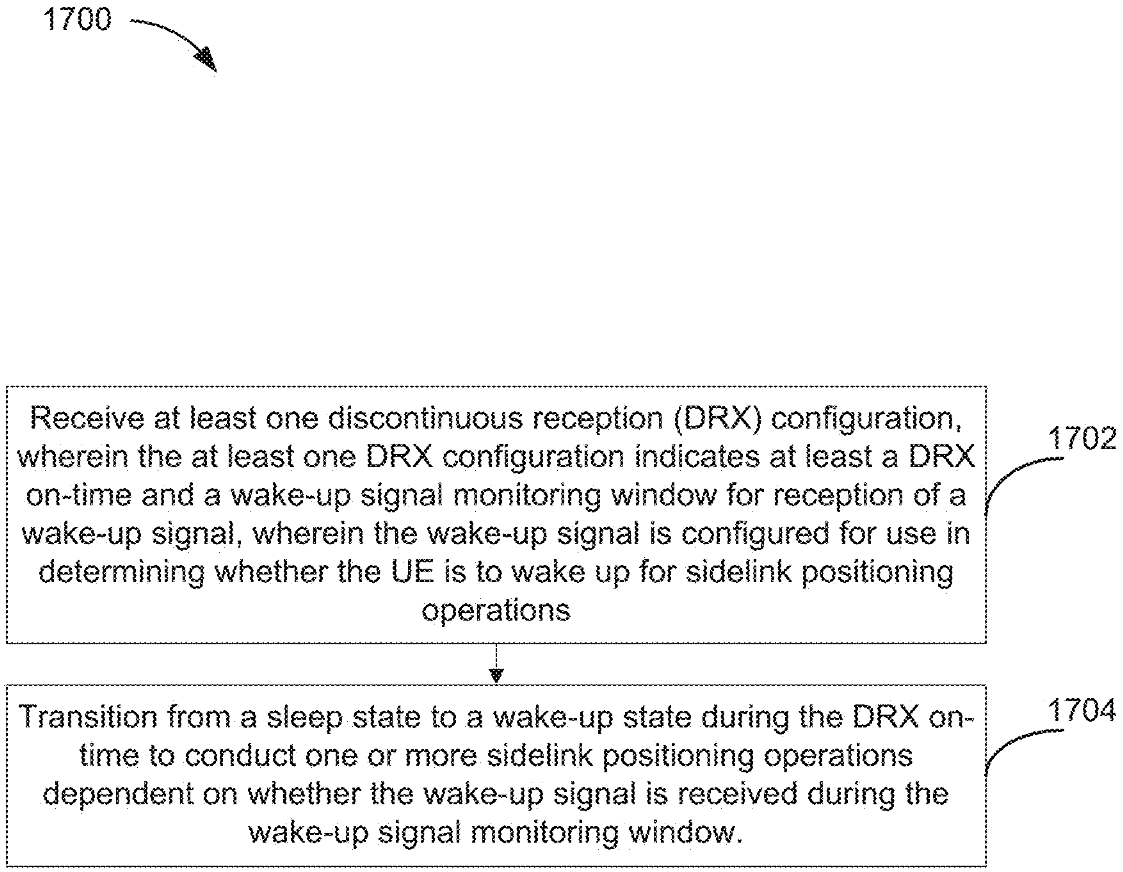
FIG. 17 illustrates an example method of wireless communication performed by a user equipment (UE), according to aspects of the disclosure.

FIG. 17 illustrates an example method 1700 of wireless communication performed by a user equipment (UE), according to aspects of the disclosure. At operation 1702, the UE receives at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations. In an aspect, operation 1702 may be performed by the one or more WWAN transceivers 310, the one or more processors 332, memory 340, and/or positioning component 342, any or all of which may be considered means for performing this operation.

At operation 1704, the UE transitions from a sleep state to a wake-up state during the DRX on-time to conduct one or more sidelink positioning operations dependent on whether the wake-up signal is received during the wake-up signal monitoring window. In an aspect, operation 1704 may be performed by the one or more WWAN transceivers 310, the one or more processors 332, memory 340, and/or positioning component 342, any or all of which may be considered means for performing this operation.

Figure 18:
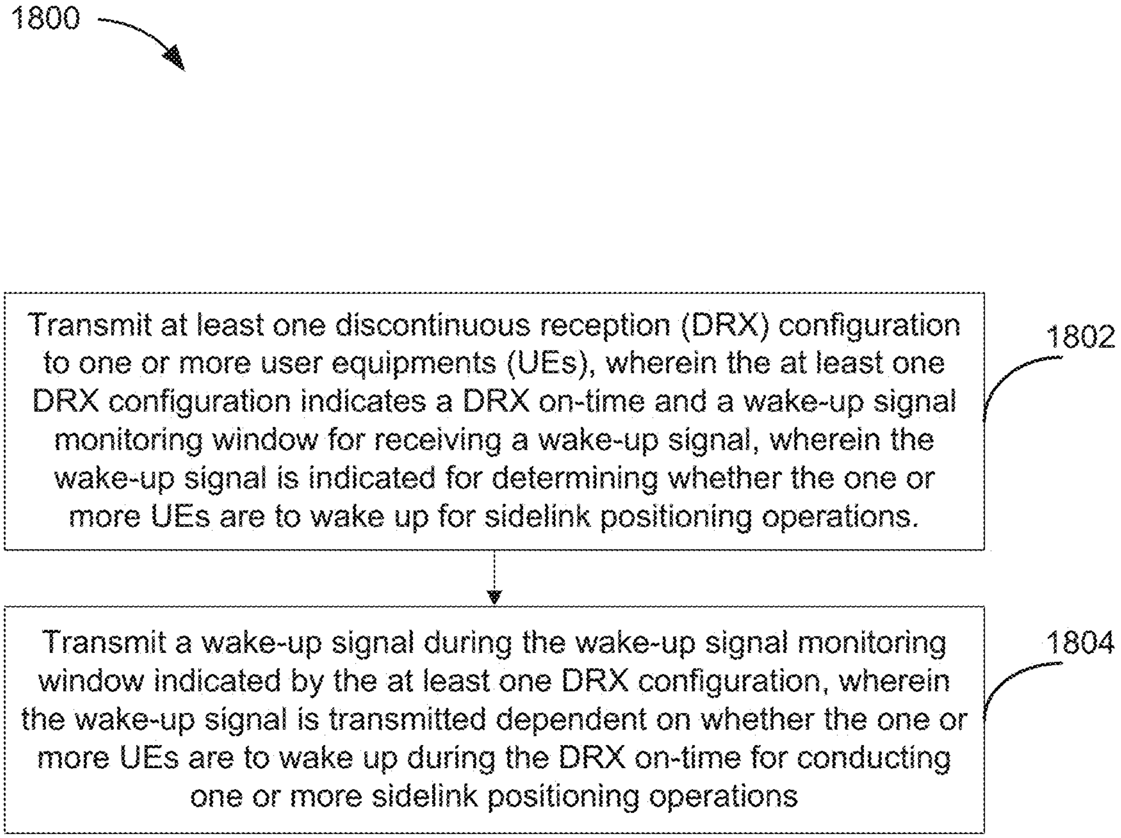
FIG. 18 illustrates an example method of wireless communication performed by a network node, according to aspects of the disclosure.

FIG. 18 illustrates an example method 1800 of wireless communication performed by a network node, such as a base station or anchor UE, according to aspects of the disclosure. At operation 1802, the network node transmits at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations. In an aspect, operation 1802 may be performed by an anchor UE using one or more WWAN transceivers 310, the one or more processors 332, memory 340, and/or positioning component 342, any or all of which may be considered means for performing this operation. In an aspect, operation 1802 may be performed by a base station using one or more WWAN transceivers 350, the one or more processors 384, memory 386, and/or positioning component 388, any or all of which may be considered means for performing this operation.

At operation 1804, the network node transmits a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations. In an aspect, operation 1804 may be performed by the one or more WWAN transceivers 310, the one or more processors 332, memory 340, and/or positioning component 342, any or all of which may be considered means for performing this operation.

As will be appreciated, a technical advantage of the methods 1700 and 1800 is that UEs are configured with DRX configurations that are specific to waking up the UEs for sidelink positioning operations. As such, the positioning WUS configured by the DRX configuration of the UE may be selectively transmitted so that the UE only wakes up to participate in sidelink positioning operations for which the UE is needed while allowing the UE to remain idle during sidelink positioning operations that do not require participation of the UE. As a result, the UE benefits from the power savings that occur during the idle times in which the UE is not participating in sidelink positioning while still being available for positioning operations in which the UE must participate.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and transitioning from a sleep state to a wake-up state during the DRX on-time to conduct one or more sidelink positioning operations dependent on whether the wake-up signal is received during the wake-up signal monitoring window.

Clause 2. The method of clause 1, wherein the one or more sidelink positioning operations comprise: reporting sidelink positioning capabilities: receiving a sidelink positioning resource signal (SL-PRS) configuration for a positioning session; measuring one or more SL-PRS: reporting one or more SL-PRS measurements: configuring one or more SL-PRS resources for transmitting one or more SL-PRS; transmitting one or more SL-PRS on one or more SL-PRS resources; reporting transmission of the one or more SL-PRS; or any combination thereof.

Clause 3. The method of any of clauses 1 to 2, wherein: the at least one DRX configuration is configured as part of a sidelink resource pool configuration.

Clause 4. The method of any of clauses 1 to 2, wherein: the at least one DRX configuration is configured as part of a sidelink positioning resource pool configuration dedicated to sidelink positioning resources.

Clause 5. The method of any of clauses 1 to 4, further comprising: remaining in the sleep state during the DRX on-time when the UE is not available for sidelink positioning operations independent of whether the wake-up signal is received during the wake-up signal monitoring window.

Clause 6. The method of any of clauses 1 to 5, wherein: the wake-up signal includes signaling indicating the one or more sidelink positioning operations that are to be conducted during the DRX on-time.

Clause 7. The method of any of clauses 1 to 6, wherein: the wake-up signal is dedicated for use in waking up the UE solely for sidelink positioning operations.

Clause 8. The method of any of clauses 1 to 7, further comprising: receiving a configuration of a pre-configured set of the one or more sidelink positioning operations to be conducted during the DRX on-time; transitioning from the sleep state to the wake-up state during the DRX on-time to conduct the pre-configured set of the one or more sidelink positioning operations in response to receiving the wake-up signal during the wake-up signal monitoring window; and remaining in the sleep state during the DRX on-time in response to an absence of receiving the wake-up signal during the wake-up signal monitoring window.

Clause 9. The method of any of clauses 1 to 7, further comprising: receiving a configuration of a pre-configured set of the one or more sidelink positioning operations to be conducted during the DRX on-time; transitioning from the sleep state to the wake-up state during the DRX on-time to conduct the pre-configured set of the one or more sidelink positioning operations in response to an absence of receiving the wake-up signal during the wake-up signal monitoring window; and remaining in the sleep state in response to receiving the wake-up signal during the wake-up signal monitoring window.

Clause 10. The method of any of clauses 1 to 9, further comprising: receiving a further discontinuous reception (DRX) configuration, wherein the further DRX configuration indicates at least a further DRX on-time and a further wake-up signal monitoring window for detecting an occurrence of a further wake-up signal, wherein the further wake-up signal is configured to wake-up the UE for one or more communication operations including monitoring sidelink control information (SCI), receiving sidelink data, or any combination thereof.

Clause 11. The method of any of clauses 1 to 6 and 8 to 10, wherein: the wake-up signal is further configured for waking up the UE for one or more communication operations including monitoring sidelink control information (SCI), receiving sidelink data, or any combination thereof.

Clause 12. The method of clauses 1 to 11, wherein: the wake-up signal is configured for waking up the UE for the one or more sidelink positioning operations based on signaling included in the wake-up signal.

Clause 13. The method of clause 12, wherein: the signaling included in the wake-up signal indicates the one or more sidelink positioning operations to be conducted during the DRX on-time.

Clause 14. A method of wireless communication performed by a network node, comprising: transmitting at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmitting a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

Clause 15. The method of clause 14, wherein: the wake-up signal is transmitted during the wake-up signal monitoring window to direct the one or more UEs to wake-up during the DRX on-time for conducting the one or more sidelink positioning operations.

Clause 16. The method of clause 14, wherein: the wake-up signal is transmitted during the wake-up signal monitoring window to prevent the one or more UEs to wake-up during the DRX on-time for conducting the one or more sidelink positioning operations.

Clause 17. The method of any of clauses 14 to 16, wherein: the wake-up signal is indicated for use in waking up the one or more UEs for sidelink positioning operations based on signaling included in the wake-up signal.

Clause 18. The method of any of clauses 14 to 17, wherein: the network node is an anchor UE; and the at least one DRX configuration is transmitted to a first set of one or more UEs associated with a first common UE group formed by the anchor UE.

Clause 19. The method of clause 18, further comprising: transmitting a further DRX configuration to a second set of one or more UEs, wherein the further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE group formed by the anchor UE.

Clause 20. The method of any of clauses 14 to 17, wherein: the network node is a base station; and the base station transmits the at least one DRX to a first set of one or more UEs associated with a first common UE zone formed by the base station.

Clause 21. The method of clause 20, further comprising: transmitting at least one further DRX configuration to a second set of one or more UEs, wherein the at least one further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE zone formed by the base station.

Clause 22. The method of any of clauses 14 to 21, wherein: the at least one DRX configuration is configured as part of a sidelink resource pool configuration.

Clause 23. The method of any of clauses 14 to 22, wherein: the DRX configuration is configured as part of a sidelink positioning resource pool configuration dedicated to configuring sidelink positioning resources.

Clause 24. The method of any of clauses 14 to 23, wherein: the wake-up signal is dedicated to waking up the one or more UEs for sidelink positioning operations.

Clause 25. The method of any of clauses 14 to 22, wherein: the wake-up signal is further indicated for use in waking up the one or more UEs for one or more communication operations including monitoring sidelink control information (SCI), receiving sidelink data, or any combination thereof.

Clause 26. A user equipment (UE), comprising: a memory; at least one transceiver; and at least one processor communicatively coupled to the memory and the at least one transceiver, the at least one processor configured to: receive, via the at least one transceiver, at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and transition from a sleep state to a wake-up state during the DRX on-time to conduct one or more sidelink positioning operations dependent on whether the wake-up signal is received during the wake-up signal monitoring window.

Clause 27. The UE of clause 26, wherein the one or more sidelink positioning operations comprise: reporting, via the at least one transceiver, sidelink positioning capabilities; receiving, via the at least one transceiver, a sidelink positioning resource signal (SL-PRS) configuration for a positioning session; measuring one or more SL-PRS; report, via the at least one transceiver, one or more SL-PRS measurements; configuring one or more SL-PRS resources for transmitting one or more SL-PRS; transmitting, via the at least one transceiver, one or more SL-PRS on one or more SL-PRS resources;

reporting, via the at least one transceiver, transmission of the one or more SL-PRS; or any combination thereof.

Clause 28. The UE of any of clauses 26 to 27, wherein: the at least one DRX configuration is configured as part of a sidelink resource pool configuration.

Clause 29. The UE of any of clauses 26 to 28, wherein: the at least one DRX configuration is configured as part of a sidelink positioning resource pool configuration dedicated to sidelink positioning resources.

Clause 30. The UE of any of clauses 26 to 29, wherein the at least one processor is further configured to: remain in the sleep state during the DRX on-time when the UE is not available for sidelink positioning operations independent of whether the wake-up signal is received during the wake-up signal monitoring window.

Clause 31. The UE of any of clauses 26 to 30, wherein: the wake-up signal includes signaling indicating the one or more sidelink positioning operations that are to be conducted during the DRX on-time.

Clause 32. The UE of any of clauses 26 to 31, wherein: the wake-up signal is dedicated for use in waking up the UE solely for sidelink positioning operations.

Clause 33. The UE of any of clauses 26 to 32, wherein the at least one processor is further configured to: receive, via the at least one transceiver, a configuration of a pre-configured set of the one or more sidelink positioning operations to be conducted during the DRX on-time; transition from the sleep state to the wake-up state during the DRX on-time to conduct the pre-configured set of the one or more sidelink positioning operations in response to receiving the wake-up signal during the wake-up signal monitoring window; and remain in the sleep state during the DRX on-time in response to an absence of receiving the wake-up signal during the wake-up signal monitoring window.

Clause 34. The UE of any of clauses 26 to 32, wherein the at least one processor is further configured to: receive, via the at least one transceiver, a configuration of a pre-configured set of the one or more sidelink positioning operations to be conducted during the DRX on-time; transition from the sleep state to the wake-up state during the DRX on-time to conduct the pre-configured set of the one or more sidelink positioning operations in response to an absence of receiving the wake-up signal during the wake-up signal monitoring window; and remain in the sleep state in response to receiving the wake-up signal during the wake-up signal monitoring window.

Clause 35. The UE of any of clauses 26 to 34, wherein the at least one processor is further configured to: receive, via the at least one transceiver, a further discontinuous reception (DRX) configuration, wherein the further DRX configuration indicates at least a further DRX on-time and a further wake-up signal monitoring window for detecting an occurrence of a further wake-up signal, wherein the further wake-up signal is configured to wake-up the UE for one or more communication operations including monitoring sidelink control information (SCI), receiving sidelink data, or any combination thereof.

Clause 36. The UE of any of clauses 26 to 31 and 33 to 35, wherein: the wake-up signal is further configured for waking up the UE for one or more communication operations including monitoring sidelink control information (SCI), receiving sidelink data, or any combination thereof.

Clause 37. The UE of any of clauses 26 to 36, wherein: the wake-up signal is configured for waking up the UE for the one or more sidelink positioning operations based on signaling included in the wake-up signal.

Clause 38. The UE of clause 37, wherein: the signaling included in the wake-up signal indicates the one or more sidelink positioning operations to be conducted during the DRX on-time.

Clause 39. A network node, comprising: a memory; at least one transceiver; and at least one processor communicatively coupled to the memory and the at least one transceiver, the at least one processor configured to: transmit, via the at least one transceiver, at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmit, via the at least one transceiver, a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

Clause 40. The network node of clause 39, wherein: the wake-up signal is transmitted during the wake-up signal monitoring window to direct the one or more UEs to wake-up during the DRX on-time for conducting the one or more sidelink positioning operations.

Clause 41. The network node of clause 39, wherein: the wake-up signal is transmitted during the wake-up signal monitoring window to prevent the one or more UEs to wake-up during the DRX on-time for conducting the one or more sidelink positioning operations.

Clause 42. The network node of any of clauses 39 to 41, wherein: the wake-up signal is indicated for use in waking up the one or more UEs for sidelink positioning operations based on signaling included in the wake-up signal.

Clause 43. The network node of any of clauses 39 to 42, wherein: the network node is an anchor UE; and the at least one DRX configuration is transmitted to a first set of one or more UEs associated with a first common UE group formed by the anchor UE.

Clause 44. The network node of clause 43, wherein the at least one processor is further configured to: transmit, via the at least one transceiver, a further DRX configuration to a second set of one or more UEs, wherein the further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE group formed by the anchor UE.

Clause 45. The network node of any of clauses 39 to 42, wherein: the network node is a base station; and the base station transmits the at least one DRX to a first set of one or more UEs associated with a first common UE zone formed by the base station.

Clause 46. The network node of clause 45, wherein the at least one processor is further configured to: transmit, via the at least one transceiver, at least one further DRX configuration to a second set of one or more UEs, wherein the at least one further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE zone formed by the base station.

Clause 47. The network node of any of clauses 39 to 46, wherein: the at least one DRX configuration is configured as part of a sidelink resource pool configuration.

Clause 48. The network node of any of clauses 39 to 47, wherein: the DRX configuration is configured as part of a sidelink positioning resource pool configuration dedicated to configuring sidelink positioning resources.

Clause 49. The network node of any of clauses 39 to 48, wherein: the wake-up signal is dedicated to waking up the one or more UEs for sidelink positioning operations.

Clause 50. The network node of any of clauses 39 to 48, wherein: the wake-up signal is further indicated for use in waking up the one or more UEs for one or more communication operations including monitoring sidelink control information (SCI), receiving sidelink data, or any combination thereof.

Clause 51. A user equipment (UE), comprising: means for receiving at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and means for transitioning from a sleep state to a wake-up state during the DRX on-time to conduct one or more sidelink positioning operations dependent on whether the wake-up signal is received during the wake-up signal monitoring window.

Clause 52. The UE of clause 51, further comprising: means for reporting sidelink positioning capabilities; means for receiving a sidelink positioning resource signal (SL-PRS) configuration for a positioning session: means for measuring one or more SL-PRS: means for reporting one or more SL-PRS measurements; means for configuring one or more SL-PRS resources for transmitting one or more SL-PRS: means for transmitting one or more SL-PRS on one or more SL-PRS resources; means for reporting transmission of the one or more SL-PRS: or any combination thereof.

Clause 53. The UE of any of clauses 51 to 52, wherein: the at least one DRX configuration is configured as part of a sidelink resource pool configuration.

Clause 54. The UE of any of clauses 51 to 53, wherein: the at least one DRX configuration is configured as part of a sidelink positioning resource pool configuration dedicated to sidelink positioning resources.

Clause 55. The UE of any of clauses 51 to 54, further comprising: means for remaining in the sleep state during the DRX on-time when the UE is not available for sidelink positioning operations independent of whether the wake-up signal is received during the wake-up signal monitoring window.

Clause 56. The UE of any of clauses 51 to 55, wherein: the wake-up signal includes signaling indicating the one or more sidelink positioning operations that are to be conducted during the DRX on-time.

Clause 57. The UE of any of clauses 51 to 56, wherein: the wake-up signal is dedicated for use in waking up the UE solely for sidelink positioning operations.

Clause 58. The UE of any of clauses 51 to 57, further comprising: means for receiving a configuration of a pre-configured set of the one or more sidelink positioning operations to be conducted during the DRX on-time; means for transitioning from the sleep state to the wake-up state during the DRX on-time to conduct the pre-configured set of the one or more sidelink positioning operations in response to receiving the wake-up signal during the wake-up signal monitoring window; and means for remaining in the sleep state during the DRX on-time in response to an absence of receiving the wake-up signal during the wake-up signal monitoring window.

Clause 59. The UE of any of clauses 51 to 58, further comprising: means for receiving a configuration of a pre-configured set of the one or more sidelink positioning operations to be conducted during the DRX on-time; means for transitioning from the sleep state to the wake-up state during the DRX on-time to conduct the pre-configured set of the one or more sidelink positioning operations in response to an absence of receiving the wake-up signal during the wake-up signal monitoring window; and means for remaining in the sleep state in response to receiving the wake-up signal during the wake-up signal monitoring window.

Clause 60. The UE of any of clauses 51 to 58, further comprising: means for receiving a further discontinuous reception (DRX) configuration, wherein the further DRX configuration indicates at least a further DRX on-time and a further wake-up signal monitoring window for detecting an occurrence of a further wake-up signal, wherein the further wake-up signal is configured to wake-up the UE for one or more communication operations including monitoring sidelink control information (SCI), receiving sidelink data, or any combination thereof.

Clause 61. The UE of any of clauses 51 to 56 and 58 to 60, wherein: the wake-up signal is further configured for waking up the UE for one or more communication operations including monitoring sidelink control information (SCI), receiving sidelink data, or any combination thereof.

Clause 62. The UE of any of clauses 51 to 61, wherein: the wake-up signal is configured for waking up the UE for the one or more sidelink positioning operations based on signaling included in the wake-up signal.

Clause 63. The UE of clause 62, wherein: the signaling included in the wake-up signal indicates the one or more sidelink positioning operations to be conducted during the DRX on-time.

Clause 64. A network node, comprising: means for transmitting at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and means for transmitting a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

Clause 65. The network node of clause 64, wherein: the wake-up signal is transmitted during the wake-up signal monitoring window to direct the one or more UEs to wake-up during the DRX on-time for conducting the one or more sidelink positioning operations.

Clause 66. The network node of clause 64, wherein: the wake-up signal is transmitted during the wake-up signal monitoring window to prevent the one or more UEs to wake-up during the DRX on-time for conducting the one or more sidelink positioning operations.

Clause 67. The network node of any of clauses 64 to 66, wherein: the wake-up signal is indicated for use in waking up the one or more UEs for sidelink positioning operations based on signaling included in the wake-up signal.

Clause 68. The network node of any of clauses 64 to 67, wherein: the network node is an anchor UE; and the at least one DRX configuration is transmitted to a first set of one or more UEs associated with a first common UE group formed by the anchor UE.

Clause 69. The network node of clause 68, further comprising: means for transmitting a further DRX configuration to a second set of one or more UEs, wherein the further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE group formed by the anchor UE.

Clause 70. The network node of any of clauses 64 to 67, wherein: the network node is a base station; and the base station transmits the at least one DRX to a first set of one or more UEs associated with a first common UE zone formed by the base station.

Clause 71. The network node of clause 70, further comprising: means for transmitting at least one further DRX configuration to a second set of one or more UEs, wherein the at least one further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE zone formed by the base station.

Clause 72. The network node of any of clauses 64 to 71, wherein: the at least one DRX configuration is configured as part of a sidelink resource pool configuration.

Clause 73. The network node of any of clauses 64 to 72, wherein: the DRX configuration is configured as part of a sidelink positioning resource pool configuration dedicated to configuring sidelink positioning resources.

Clause 74. The network node of any of clauses 64 to 73, wherein: the wake-up signal is dedicated to waking up the one or more UEs for sidelink positioning operations.

Clause 75. The network node of any of clauses 64 to 73, wherein: the wake-up signal is further indicated for use in waking up the one or more UEs for one or more communication operations including monitoring sidelink control information (SCI), receiving sidelink data, or any combination thereof.

Clause 76. A non-transitory computer-readable medium storing computer-executable instructions that, when executed by a user equipment (UE), cause the UE to: receive at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations; and transition from a sleep state to a wake-up state during the DRX on-time to conduct one or more sidelink positioning operations dependent on whether the wake-up signal is received during the wake-up signal monitoring window.

Clause 77. The non-transitory computer-readable medium of clause 76, wherein the one or more sidelink positioning operations comprise: reporting sidelink positioning capabilities; receiving a sidelink positioning resource signal (SL-PRS) configuration for a positioning session; measuring one or more SL-PRS; reporting one or more SL-PRS measurements; configuring one or more SL-PRS resources for transmitting one or more SL-PRS; transmitting one or more SL-PRS on one or more SL-PRS resources; reporting transmission of the one or more SL-PRS: or any combination thereof.

Clause 78. The non-transitory computer-readable medium of any of clauses 76 to 77, wherein: the at least one DRX configuration is configured as part of a sidelink resource pool configuration.

Clause 79. The non-transitory computer-readable medium of any of clauses 76 to 78, wherein: the at least one DRX configuration is configured as part of a sidelink positioning resource pool configuration dedicated to sidelink positioning resources.

Clause 80. The non-transitory computer-readable medium of any of clauses 76 to 79, further comprising computer-executable instructions that, when executed by the UE, cause the UE to: remain in the sleep state during the DRX on-time when the UE is not available for sidelink positioning operations independent of whether the wake-up signal is received during the wake-up signal monitoring window.

Clause 81. The non-transitory computer-readable medium of any of clauses 76 to 80, wherein: the wake-up signal includes signaling indicating the one or more sidelink positioning operations that are to be conducted during the DRX on-time.

Clause 82. The non-transitory computer-readable medium of any of clauses 76 to 81, wherein: the wake-up signal is dedicated for use in waking up the UE solely for sidelink positioning operations.

Clause 83. The non-transitory computer-readable medium of any of clauses 76 to 82, further comprising computer-executable instructions that, when executed by the UE, cause the UE to: receive a configuration of a pre-configured set of the one or more sidelink positioning operations to be conducted during the DRX on-time; transition from the sleep state to the wake-up state during the DRX on-time to conduct the pre-configured set of the one or more sidelink positioning operations in response to receiving the wake-up signal during the wake-up signal monitoring window; and remain in the sleep state during the DRX on-time in response to an absence of receiving the wake-up signal during the wake-up signal monitoring window.

Clause 84. The non-transitory computer-readable medium of any of clauses 76 to 83, further comprising computer-executable instructions that, when executed by the UE, cause the UE to: receive a configuration of a pre-configured set of the one or more sidelink positioning operations to be conducted during the DRX on-time; transition from the sleep state to the wake-up state during the DRX on-time to conduct the pre-configured set of the one or more sidelink positioning operations in response to an absence of receiving the wake-up signal during the wake-up signal monitoring window; and remain in the sleep state in response to receiving the wake-up signal during the wake-up signal monitoring window.

Clause 85. The non-transitory computer-readable medium of any of clauses 76 to 83, further comprising computer-executable instructions that, when executed by the UE, cause the UE to: receive a further discontinuous reception (DRX) configuration, wherein the further DRX configuration indicates at least a further DRX on-time and a further wake-up signal monitoring window for detecting an occurrence of a further wake-up signal, wherein the further wake-up signal is configured to wake-up the UE for one or more communication operations including monitoring sidelink control information (SCI), receiving sidelink data, or any combination thereof.

Clause 86. The non-transitory computer-readable medium of any of clauses 76 to 81 and 83 to 85, wherein: the wake-up signal is further configured for waking up the UE for one or more communication operations including monitoring sidelink control information (SCI), receiving sidelink data, or any combination thereof.

Clause 87. The non-transitory computer-readable medium of clause 86, wherein: the wake-up signal is configured for waking up the UE for the one or more sidelink positioning operations based on signaling included in the wake-up signal.

Clause 88. The non-transitory computer-readable medium of clause 87, wherein: the signaling included in the wake-up signal indicates the one or more sidelink positioning operations to be conducted during the DRX on-time.

Clause 89. A non-transitory computer-readable medium storing computer-executable instructions that, when executed by a network node, cause the network node to: transmit at least one discontinuous reception (DRX) configuration to one or more user equipments (UEs), wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmit a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

Clause 90. The non-transitory computer-readable medium of clause 89, wherein: the wake-up signal is transmitted during the wake-up signal monitoring window to direct the one or more UEs to wake-up during the DRX on-time for conducting the one or more sidelink positioning operations.

Clause 91. The non-transitory computer-readable medium clause 89, wherein: the wake-up signal is transmitted during the wake-up signal monitoring window to prevent the one or more UEs to wake-up during the DRX on-time for conducting the one or more sidelink positioning operations.

Clause 92. The non-transitory computer-readable medium of any of clauses 89 to 91, wherein: the wake-up signal is indicated for use in waking up the one or more UEs for sidelink positioning operations based on signaling included in the wake-up signal.

Clause 93. The non-transitory computer-readable medium of any of clauses 89 to 92, further comprising computer-executable instructions that, when executed by the network node, cause the network node to: operate as an anchor UE; and transmit the at least one DRX configuration to a first set of one or more UEs associated with a first common UE group formed by the anchor UE.

Clause 94. The non-transitory computer-readable medium of clause 93, further comprising computer-executable instructions that, when executed by the network node, cause the network node to: transmit a further DRX configuration to a second set of one or more UEs, wherein the further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE group formed by the anchor UE.

Clause 95. The non-transitory computer-readable medium of any of clauses 89 to 92, further comprising computer-executable instructions that, when executed by the network node, cause the network node to: operate as a base station; and the base station transmits the at least one DRX to a first set of one or more UEs associated with a first common UE zone formed by the base station.

Clause 96. The non-transitory computer-readable medium of clause 95, further comprising computer-executable instructions that, when executed by the network node, cause the network node to: transmit at least one further DRX configuration to a second set of one or more UEs, wherein the at least one further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs arm associated with a second common UE zone formed by the base station.

Clause 97. The non-transitory computer-readable medium of any of clauses 89 to 96, wherein: the at least one DRX configuration is configured as part of a sidelink resource pool configuration.

Clause 98. The non-transitory computer-readable medium of any of clauses 89 to 97, wherein: the DRX configuration is configured as part of a sidelink positioning resource pool configuration dedicated to configuring sidelink positioning resources.

Clause 99. The non-transitory computer-readable medium of any of clauses 89 to 98, wherein: the wake-up signal is dedicated to waking up the one or more UEs for sidelink positioning operations.

Clause 100. The non-transitory computer-readable medium of any of clauses 89 to 98, wherein: the wake-up signal is further indicated for use in waking up the one or more UEs for one or more communication operations including monitoring sidelink control information (SCI), receiving sidelink data, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, a FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and BLU-RAY® optical disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:

receiving at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations;

transitioning from a sleep state to a wake-up state during the DRX on-time to conduct one or more sidelink positioning operations dependent on whether the wake-up signal is received during the wake-up signal monitoring window; and remaining in the sleep state during the DRX on-time when the UE is not available for sidelink positioning operations independent of whether the wake-up signal is received during the wake-up signal monitoring window.

2. The method of claim 1, wherein the one or more sidelink positioning operations comprise:

reporting sidelink positioning capabilities;

receiving a sidelink positioning resource signal (SL-PRS) configuration for a positioning session;

measuring one or more SL-PRS;

reporting one or more SL-PRS measurements;

configuring one or more SL-PRS resources for transmitting one or more SL-PRS;

transmitting one or more SL-PRS on one or more SL-PRS resources;

reporting transmission of the one or more SL-PRS; or any combination thereof.

3. The method of claim 1, wherein:

the at least one DRX configuration is configured as part of a sidelink resource pool configuration.

4. The method of claim 1, wherein:

the at least one DRX configuration is configured as part of a sidelink positioning resource pool configuration dedicated to sidelink positioning resources.

5. The method of claim 1, wherein:

the wake-up signal includes signaling indicating the one or more sidelink positioning operations that are to be conducted during the DRX on-time.

6. The method of claim 1, wherein:

the wake-up signal is dedicated for use in waking up the UE solely for sidelink positioning operations.

7. The method of claim 6, further comprising:

receiving a configuration of a pre-configured set of the one or more sidelink positioning operations to be conducted during the DRX on-time;

transitioning from the sleep state to the wake-up state during the DRX on-time to conduct the pre-configured set of the one or more sidelink positioning operations in response to receiving the wake-up signal during the wake-up signal monitoring window; and remaining in the sleep state during the DRX on-time in response to an absence of receiving the wake-up signal during the wake-up signal monitoring window.

8. The method of claim 6, further comprising:

receiving a configuration of a pre-configured set of the one or more sidelink positioning operations to be conducted during the DRX on-time;

transitioning from the sleep state to the wake-up state during the DRX on-time to conduct the pre-configured set of the one or more sidelink positioning operations in response to an absence of receiving the wake-up signal during the wake-up signal monitoring window; and remaining in the sleep state in response to receiving the wake-up signal during the wake-up signal monitoring window.

9. The method of claim 1, further comprising:

receiving a further discontinuous reception (DRX) configuration, wherein the further DRX configuration indicates at least a further DRX on-time and a further wake-up signal monitoring window for detecting an occurrence of a further wake-up signal, wherein the further wake-up signal is configured to wake-up the UE for one or more communication operations including monitoring sidelink control information (SCI), receiving sidelink data, or any combination thereof.

10. The method of claim 1, wherein:

the wake-up signal is further configured for waking up the UE for one or more communication operations including monitoring sidelink control information (SCI), receiving sidelink data, or any combination thereof.

11. The method of claim 10, wherein:

the wake-up signal is configured for waking up the UE for the one or more sidelink positioning operations based on signaling included in the wake-up signal.

12. The method of claim 11, wherein:

the signaling included in the wake-up signal indicates the one or more sidelink positioning operations to be conducted during the DRX on-time.

13. A method of wireless communication performed by a network node operating as an anchor UE, comprising:

transmitting at least one discontinuous reception (DRX) configuration to a first set of one or more user equipments (UEs) associated with a first common UE group formed by the anchor UE, wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmitting a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

14. The method of claim 13, wherein:

the wake-up signal is transmitted during the wake-up signal monitoring window to direct the one or more UEs to wake-up during the DRX on-time for conducting the one or more sidelink positioning operations.

15. The method of claim 13, wherein:

the wake-up signal is transmitted during the wake-up signal monitoring window to prevent the one or more UEs to wake-up during the DRX on-time for conducting the one or more sidelink positioning operations.

16. The method of claim 13, wherein:

the wake-up signal is indicated for use in waking up the one or more UEs for sidelink positioning operations based on signaling included in the wake-up signal.

17. The method of claim 13, further comprising:

transmitting a further DRX configuration to a second set of one or more UEs, wherein the further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE group formed by the anchor UE.

18. The method of claim 13, wherein:

the network node is a base station; and the base station transmits the at least one DRX to a first set of one or more UEs associated with a first common UE zone formed by the base station.

19. The method of claim 18, further comprising:

transmitting at least one further DRX configuration to a second set of one or more UEs, wherein the at least one further DRX configuration indicates a further DRX on-time and a further wake-up signal monitoring window for receiving a further wake-up signal, wherein the further wake-up signal is indicated for use in waking up the second set of one or more UEs for sidelink positioning operations, and wherein the second set of one or more UEs are associated with a second common UE zone formed by the base station.

20. The method of claim 13, wherein:

the at least one DRX configuration is configured as part of a sidelink resource pool configuration.

21. The method of claim 13, wherein:

the DRX configuration is configured as part of a sidelink positioning resource pool configuration dedicated to configuring sidelink positioning resources.

22. The method of claim 13, wherein:

the wake-up signal is dedicated to waking up the one or more UEs for sidelink positioning operations.

23. The method of claim 13, wherein:

the wake-up signal is further indicated for use in waking up the one or more UEs for one or more communication operations including monitoring sidelink control information (SCI), receiving sidelink data, or any combination thereof.

24. A user equipment (UE), comprising:

a memory;

one or more transceivers; and one or more processors communicatively coupled to the memory and the one or more transceivers, the one or more processors configured to:

receive, via the one or more transceivers, at least one discontinuous reception (DRX) configuration, wherein the at least one DRX configuration indicates at least a DRX on-time and a wake-up signal monitoring window for reception of a wake-up signal, wherein the wake-up signal is configured for use in determining whether the UE is to wake-up for sidelink positioning operations;

transition from a sleep state to a wake-up state during the DRX on-time to conduct one or more sidelink positioning operations dependent on whether the wake-up signal is received during the wake-up signal monitoring window; and remain in the sleep state during the DRX on-time when the UE is not available for sidelink positioning operations independent of whether the wake-up signal is received during the wake-up signal monitoring window.

25. The UE of claim 24, wherein the one or more sidelink positioning operations comprise:

report, via the one or more transceivers, sidelink positioning capabilities;

receive, via the one or more transceivers, a sidelink positioning resource signal (SL-PRS) configuration for a positioning session;

measure one or more SL-PRS;

report, via the the one or more transceivers, one or more SL-PRS measurements;

configure one or more SL-PRS resources for transmitting one or more SL-PRS;

transmit, via the one or more transceivers, one or more SL-PRS on one or more SL-PRS resources;

report, via the one or more transceivers, transmission of the one or more SL-PRS; or any combination thereof.

26. The UE of claim 24, wherein:

the wake-up signal includes signaling indicating the one or more sidelink positioning operations that are to be conducted during the DRX on-time.

27. A network node operating as an anchor UE, comprising:

a memory;

one or more transceivers; and one or more processors communicatively coupled to the memory and the one or more transceivers, the one or more processors configured to:

transmit, via the one or more transceivers, at least one discontinuous reception (DRX) configuration to a first set of one or more user equipments (UEs) associated with a first common UE group formed by the anchor UE, wherein the at least one DRX configuration indicates a DRX on-time and a wake-up signal monitoring window for receiving a wake-up signal, wherein the wake-up signal is indicated for determining whether the one or more UEs are to wake-up for sidelink positioning operations; and transmit, via the one or more transceivers, a wake-up signal during the wake-up signal monitoring window indicated by the at least one DRX configuration, wherein the wake-up signal is transmitted dependent on whether the one or more UEs are to wake-up during the DRX on-time for conducting one or more sidelink positioning operations.

28. The network node of claim 27, wherein:

the wake-up signal is indicated for use in waking up the one or more UEs for sidelink positioning operations based on signaling included in the wake-up signal.

* * * * *